FIG. I.

Step I: Loading

Step II: Unloading (Neutrals & Acidics)

INVENTOR
Elliott J. Roberts,
BY
Arthur Middleton
ATTORNEY

Step III: Stripping (Basics removed)

Step IIIa Regeneration after Step III

INVENTOR
Elliott J. Roberts,
BY
Arthur Middleton
ATTORNEY

March 25, 1952  E. J. ROBERTS  2,590,209
FRACTIONATION OF AMINO ACID MIXTURES
Original Filed March 4, 1947  13 Sheets-Sheet 4

Step IV:
Separating

Step V:
Removing

INVENTOR
Elliott J. Roberts,
BY
ATTORNEY

March 25, 1952  E. J. ROBERTS  2,590,209
FRACTIONATION OF AMINO ACID MIXTURES
Original Filed March 4, 1947  13 Sheets-Sheet 5

INVENTOR
Elliott J. Roberts,
BY
ATTORNEY

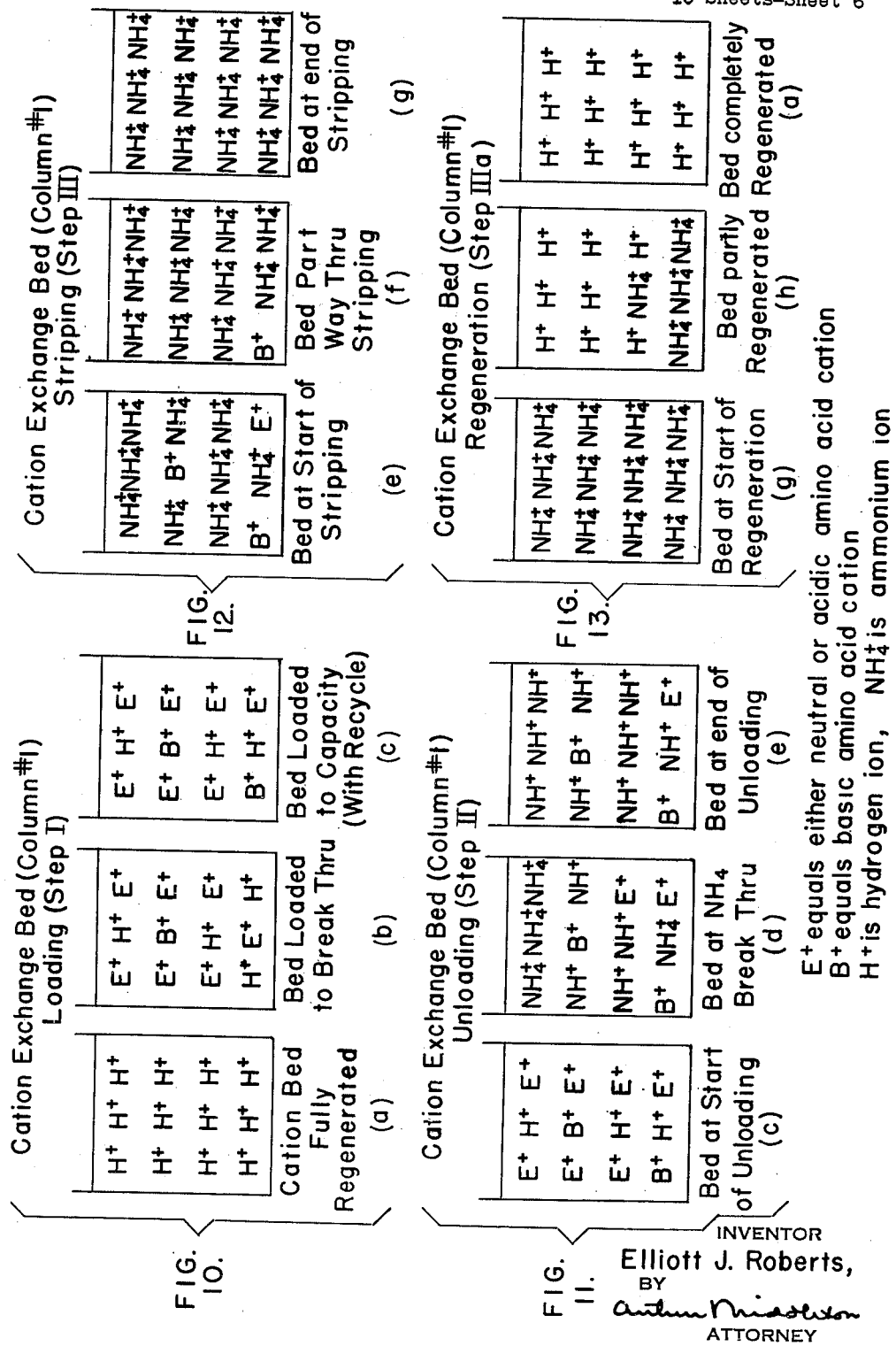

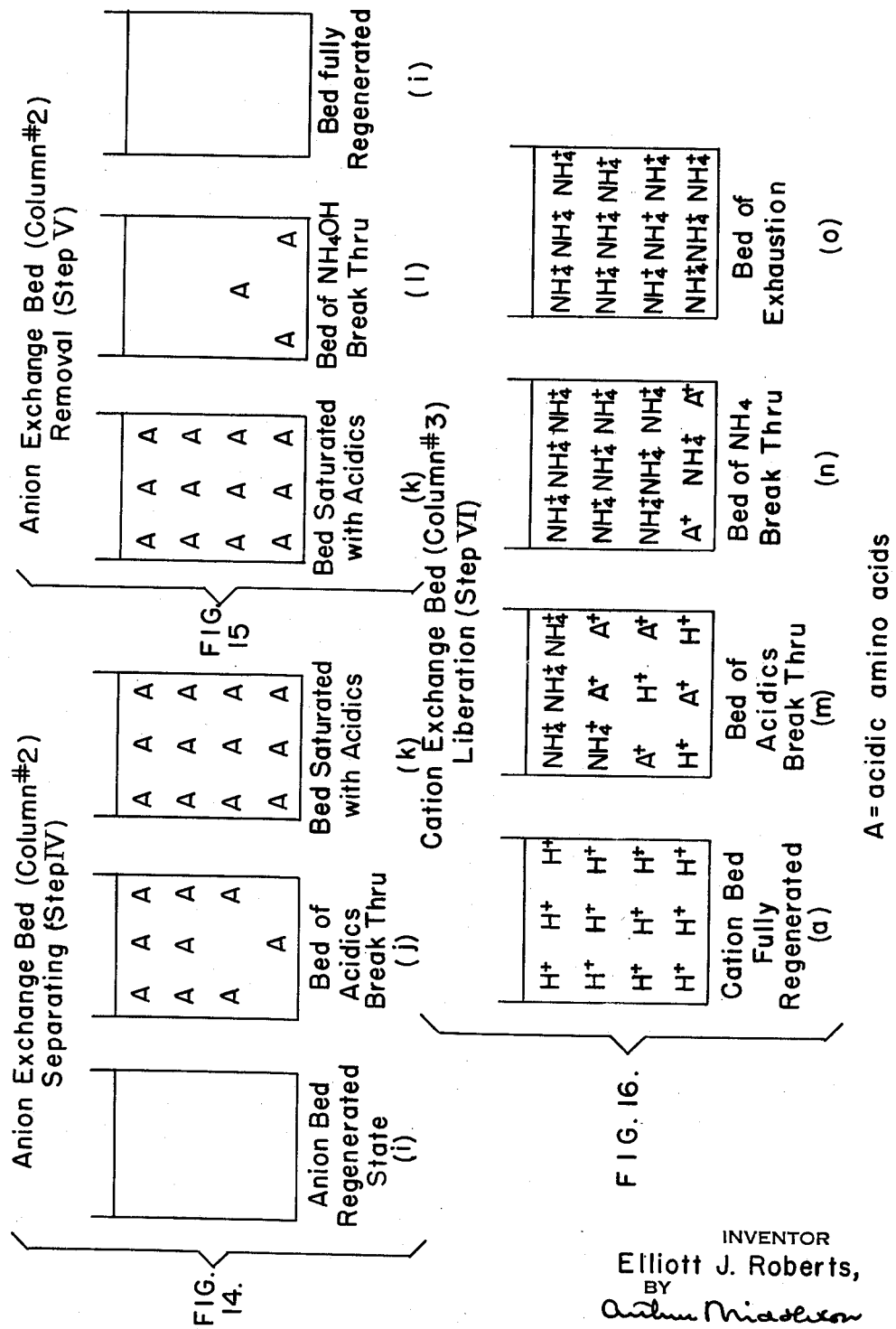

March 25, 1952     E. J. ROBERTS     2,590,209
FRACTIONATION OF AMINO ACID MIXTURES
Original Filed March 4, 1947     13 Sheets-Sheet 8
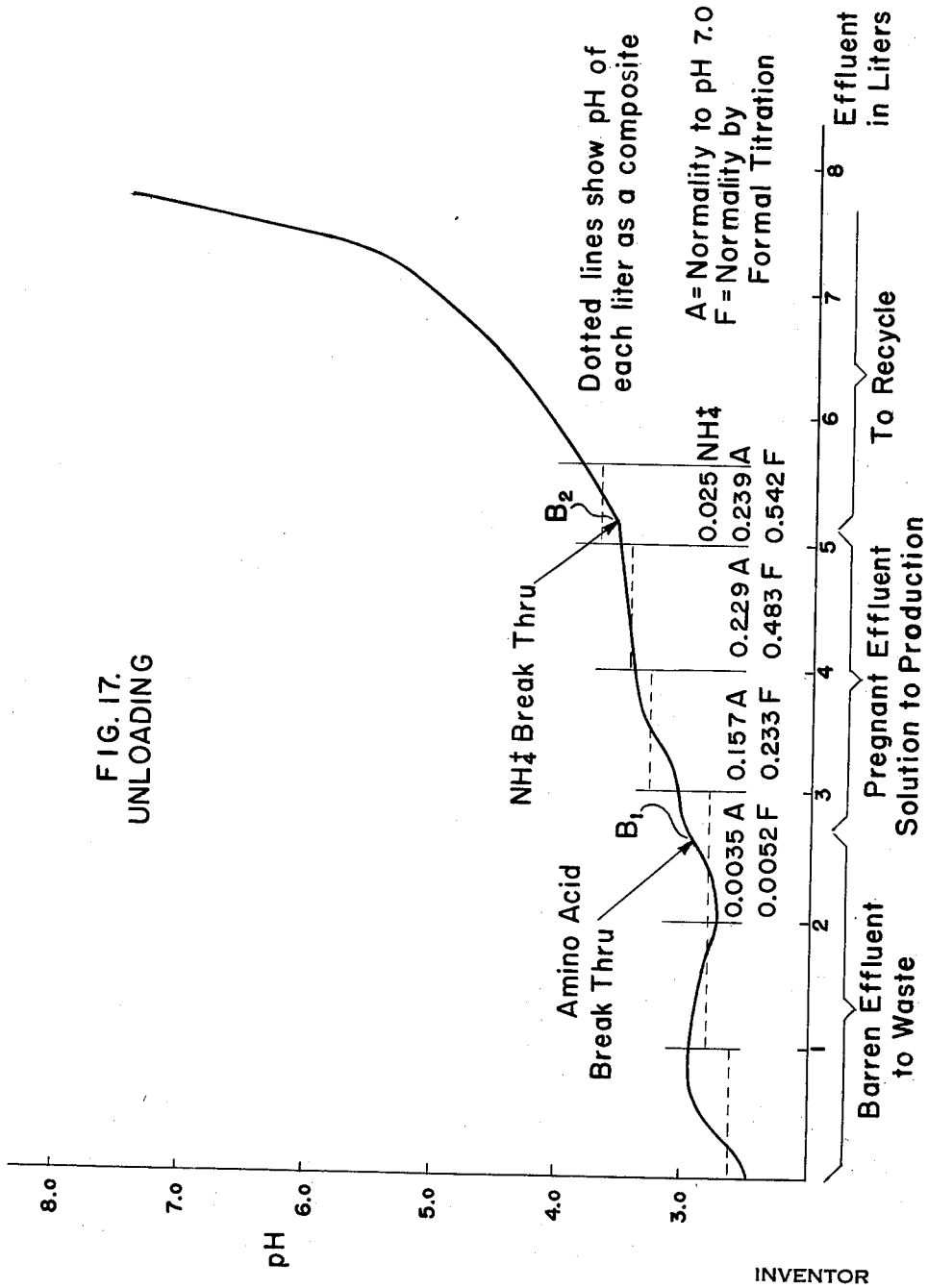
INVENTOR
Elliott J. Roberts,
BY
ATTORNEY

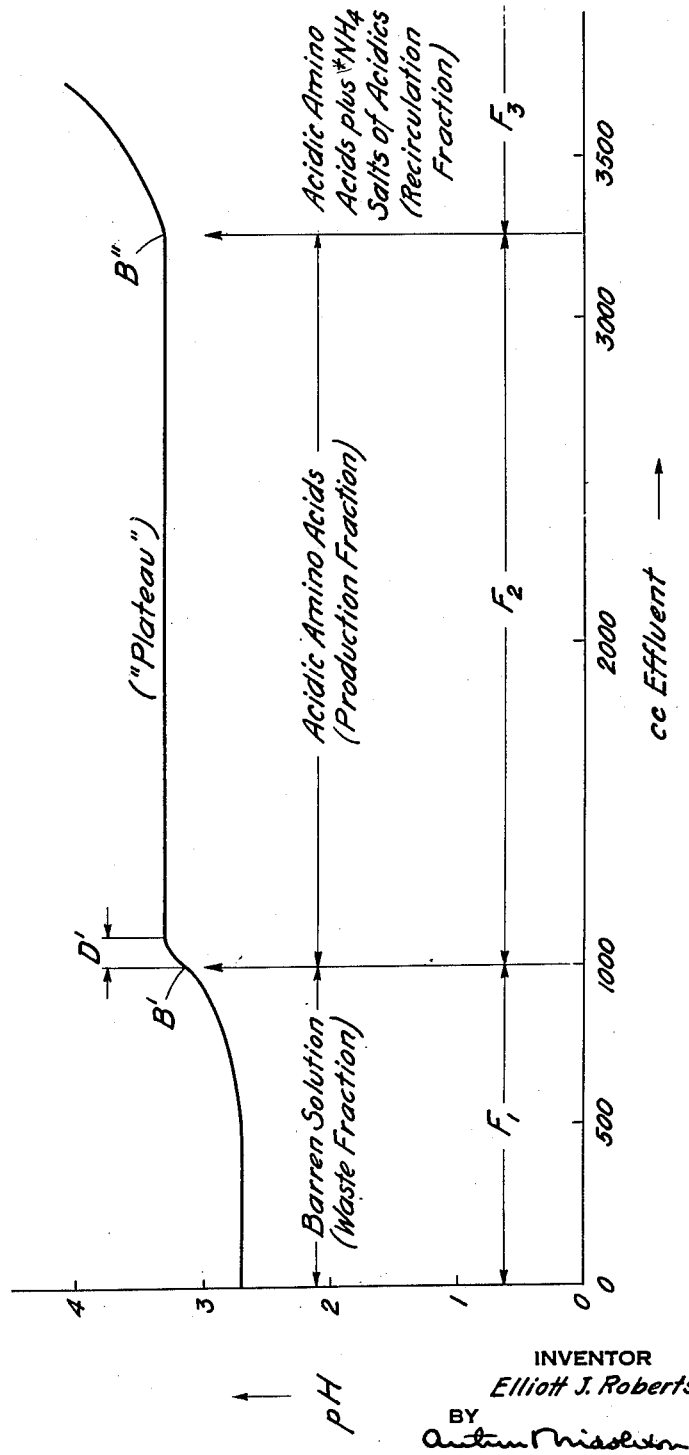

March 25, 1952  E. J. ROBERTS  2,590,209
FRACTIONATION OF AMINO ACID MIXTURES
Original Filed March 4, 1947  13 Sheets-Sheet 11

*Step I. Loading:*

(1) For Reaction with Contaminants:
        $2XH + (NH_4)_2 S'O_4 \longrightarrow 2XNH_4 + H_2S'O_4$ (2) For Reaction with Amino Acids
        $XH + (COOH)RNH_3Cl \longrightarrow XNH_3RCOOH + Cl$ Note:    X = Functional Radicle of the Cation Exchange Material
        R = the Balance of the Amino Acid Molecule

*Step II. Unloading:*

$X(NH_3RCOOH) + NH_4OH \longrightarrow XNH_4 + NH_2RCOOH + H_2O$
    R = Organic Radicle of the Amino Acid Molecule

*Step III. Stripping:*

$X(NH_3R'COOH) + NH_4HCO_3 \longrightarrow X(NH_4) + NH_2R'COOH + H_2CO_3$
    R' = Organic Radical containing Basic Group, i.e. the
        Balance of the Molecule of a Basic Amino Acid Molecule

*Step IV. Separating:*

$Y + Acidic\ Amino\ Acid \longrightarrow Y(Acidic\ Amino\ Acid)$
    Y = Functional Radicle of the Anion Exchange Material

*Step V. Removing:*

$Y(Acidic\ Amino\ Acid) = NH_4OH \longrightarrow NH_4(Acidic\ Amino\ Acid) + H_2O$
    Y = Functional Radicle of the Cation Exchange Material

*Step VI. Liberating:*

(1) $2XH + NH_4(Acidics \longrightarrow XNH_4 + X(Acidics)$
    (2) $X\ acidics + NH_4(Acidics \longrightarrow XNH_4 + 2(Acidics)$
    X = Functional Radicle of the Cation Exchange Material

*Fig. 20.*

INVENTOR
Elliott J. Roberts
BY
ATTORNEY

March 25, 1952 E. J. ROBERTS 2,590,209
FRACTIONATION OF AMINO ACID MIXTURES
Original Filed March 4, 1947 13 Sheets-Sheet 13

INVENTOR:
ELLIOTT J. ROBERTS,
BY
ATTORNEY

Patented Mar. 25, 1952

2,590,209

UNITED STATES PATENT OFFICE 2,590,209

FRACTIONATION OF AMINO ACID MIXTURES

Elliott J. Roberts, Westport, Conn., assignor to The Dorr Company, Stamford, Conn., a corporation of Delaware Substitute for abandoned application Serial No. 732,161, May 4, 1947. This application April 5, 1950, Serial No. 154,053

3 Claims. (Cl. 260—529)

This is a substitute for parent application Serial No. 732,161, now abandoned, filed March 4, 1947.

This invention relates to the isolation of groups of amino acids from protein sources, for instance the groups of acidic-, of neutral-, and of basic amino acids from the source of protein and from one another, these three groups of amino acids being usually contained in sources of complete protein.

Such proteins can be digested or broken down or hydrolyzed by treatment with a strong acid, such as hydrochloric acid, to produce an impure solution mixture of these groups of amino acids. Hence, this invention more specifically expressed, relates to the isolation or fractionation of these three amino acid groups from one another and from the protein hydrolysate.

This invention proposes to effect such fractionation by subjecting the mixed solution to the selective action of ion exchange material such as H-ions yielding cation exchange materials which operate in the hydrogen cycle as well as anion exchange materials which are acid-adsorbers and are said to operate in the hydroxyl cycle, such exchange materials being preferably organic and in the nature of synthetic resins.

The neutral and basic groups are essentials for human nourishment whereas the acidic group in general is advantageous for the flavoring of food. Glutamic acid is an example of such flavoring amino acid which at present is not known to have an essential nutritional value. One object of the invention, therefore, can be said to lie in recovering from a protein source or protein hydrolysate the acidics per se in isolation from the neutral and basic amino acids.

Amino acids are found in many food substances but it is an object of this invention to utilize a cheap source of supply of protein starting material from which desired groups of amino acids can be fractionated. Such a source is soy beans.

Another object of this invention is to devise a method whereby groups of amino acids can be isolated from their source in a commercially economical manner.

A further object is to fractionate these amino acids in such a manner that the acidic amino acids which are taste-imparting are separated from the neutral and the basic amino acids which represent predominantly nutritional values, while obtaining the fractions in substantially pure or substantially uncontaminated condition.

A further object is to devise an amino acid fractionating method which will yield the fractionated amino acids in solution phase and in an environment from which they can be economically recovered or crystallized.

When a solution of the hydrochlorides or hydrosulfates of the amino acids is subjected to treatment in a bed of cation exchange material in the hydrogen form, all three types or groups of such amino acids may be extracted from the solution by the exchange material and become sorbed by the grains of the cation exchange material which in turn releases a quantity of H-ions, thus reforming HCl or $H_2SO_4$. Consequently the cation exchange bed becomes loaded with substantially all groups of the amino acids, as amino acid cations displace hydrogen ions of the exchange material and acidified waste effluent passes out from the bed of the cation exchange material. Hence, another object is to devise ways and means whereby groups of amino acids are removed sequentially from the bed.

In attaining these objects, the neutrals in conjunction with the acidic amino acids are removed or unloaded as one fraction and the basic amino acids as another fraction in what is herein termed primary separation operation. This invention further proposes to fractionate the neutral- from the acidic amino acids in what is herein termed secondary separation operation utilizing selective action of an exchange material. Therefore, the cation exchange bed is to be loaded with the three groups of amino acids, and then to be selectively unloaded, and it is proposed to accomplish this in such a manner that the neutrals and the acidics together are first unloaded or displaced in one fraction by means of a first specially suited displacing solution, while the remaining basics are subsequently unloaded or displaced or stripped by means of another specially suited displacing solution, for example a solution whereby they can be recovered as carbonates. This latter unloading phase will herein be called Stripping because it involves the removal from the cation exchange bed of the residual basics which have remained therein after the acidics and neutrals have been jointly removed therefrom by what is herein called Unloading. The unloaded joint neutrals and acidic fraction and the basics fraction will herein also be called the two primary fractions, and accordingly the Unloading and the Stripping phases represent the primary fractionation.

Consequently, the unloaded fraction or solution which contains both the acidics and the neutrals is subjected to the secondary fractionation whereby the acidics are separated from the neutrals, and this will be called Separating. The resulting fractions are herein also called the secondary fractions.

This Separating is accomplished by passing the fraction or solution that contains substantially only the acidics and the neutrals in mixture through a bed of anion exchange material the selective action of which, under certain environmental conditions, allows the neutrals to pass as effluent from the anion bed, but holds the acidics sorbed by the grains of the anion exchange material.

The next step is to remove from the anion bed the acidics residual therein, which step is herein called Removing and comprises treating the anion bed with an alkali solution, for example the hydroxide of ammonium or sodium, although the former is preferred because of its lower cost. The resulting effluent solution contains the acidics fraction, for example glutamic and aspartic acids, but they are in the form of respective salts, in this case ammonium- or sodium glutamate and ammonium- or sodium aspartate (as the case may be, depending upon which hydroxide is used). It is proposed to liberate the acids as such by passing the solution through a bed of cation exchange material which operates in the H-ion cycle.

Thus this invention involves the steps of Loading, Unloading, Stripping, Separating, Removing, and Liberating.

Loading is the accumulation of all three groups of amino acids in the H-ion regenerated cation bed (column No. 1).

Unloading is the joint removal from that bed of the neutrals and the acidics.

Stripping is the removal from the cation exchange bed of the basics remaining therein after the neutrals and the acidics have first been jointly removed from that bed.

Separating is the fractionation of the neutrals from the acidics (column No. 2).

Removing is the relieving of the anion exchange bed of the acidics remaining therein after the neutrals have been fractionated therefrom.

Liberating is the reclaiming of the acidics as such from their salts (column No. 3).

Thereafter follows the recovery of these acidics in crystalline form.

In the fractionation of the different groups of amino acids, the control of pH is important, indeed critical if uncontaminated fractions are to be obtained. This will be gone into in detail as this specification proceeds, and indeed so will other refinements of this invention. Other features of the invention reside in the utilization of intermediate or contaminated fractions; the recovery of acid for re-use; the prevention of crystallization of acidics in the anion bed; and still other features that will appear as this specification proceeds.

It is noteworthy with respect to the conduct of the process according to this invention that in the acidic amino compounds the acidic amino acid molecule has only one basic radical but two acidic radicals, which structure renders the molecule preponderantly acidic; the neutral amino acids have in each molecule one basic as well as one acid radical tending to balance and neutralize each other and thus rendering the molecule as such substantially neutral; the basic amino acids have in each molecule two basic radicals but only one acid radical, which structure renders the molecule preponderantly basic.

In other words, it is the additional acid- or basic radical that renders the respective amino acid either more strongly acid or more strongly basic as the case may be.

That is, pH-characteristics of the respective acidic-, neutral-, and basic amino compounds are substantiated in and by the following tabulation (Table A) of pH values.

Complete proteins contain the three groups (neutral, acidic, and basic) of amino acids representatives of each of which are listed in the following tabulation:

TABLE A

| Name | pH of Dilute Solutions | | |
|---|---|---|---|
| | Pure Acid | Hydro-chloride | Na-Salt |
| A. Neutral Amino Acids (Nutritional) average pH 5.0 to 6.0: | | | |
| Glycine | 6.0 | [1] <1 | >11 |
| Alanine | 6.0 | [1] <1 | >11 |
| Valine | 6.0 | [1] <1 | >11 |
| Leucine | 6.0 | [1] <1 | >11 |
| Isoleucine | 6.0 | [1] <1 | >11 |
| Serine | 5.7 | [1] <1 | >11 |
| Threonine | no data | [1] <1 | >11 |
| Proline | 6.3 | [1] <1 | >11 |
| Hydroxyproline | 5.7 | [1] <1 | >11 |
| Tyrosine | 5.7 | [1] <1 | 9.6 |
| Tryptophane | 5.9 | [1] <1 | >11 |
| Phenylalanine | 5.5 | [1] <1 | >11 |
| Cystine | 5.1 | [1] <1 | >11 |
| Methionine | 5.7 | [1] <1 | >11 |
| B. Acidic Amino Acids (Taste-imparting) average pH 3.0: | | | |
| Aspartic Acid | 2.8 | [1] <1 | 6.6 |
| Glutamic Acid | 3.2 | [1] <1 | 7.0 |
| C. Basic Amino Acids (Nutritional): | | | |
| Histidine | 7.6 | [2] 3.9 | >11 |
| Lysine | 9.7 | [2] 5.6 | >11 |
| Arginine | 10.8 | [2] 5.6 | >11 |

[1] Average pH 1.0.
[2] Average pH 4.0.

This tabulation lists 19 of 21 known amino acids divisible into the above three groups and according to the pH of their aqueous solutions and the characteristic groupings influencing the pH. The neutral amino acids, in pure water solution, exhibit a pH of around 6.0. The acidic amino acids carry an extra COOH-group in the radical R and this acidic group causes the pH of their solutions to be around 3.0. The basic amino acids have an extra NH or $NH_2$ in the radical R, which basic group causes the pH to be on the alkaline side from 7.6 to 10.8. The tabulation presents not only the pH of the pure amino acid solution, but also the pH of the hydrochloride and of the Na-salt. These figures serve to bring out characteristic differences in the behavior of the groups although full titration curves of each are necessary to obtain a complete picture of the behavior characteristics.

With respect to primary separation, the pH of the hydrochloride solutions may explain the behavior of the groups on the cation exchange material. The basic amino acid hydrochlorides have a pH of 3.9 or greater while both the neutral and acidic amino acid hydrochlorides register a pH of less than 1.0. Thus at a pH of around 4.0 the basic amino acids will exist almost completely as cations and be held by the cation exchange material while the other two groups will be almost entirely in the non-cationic form and therefore not be held by the cation exchange material. A separation is therefore possible.

With respect to secondary separation, the fact that pure solutions of the acidics have sufficient acid strength to give a pH of around 3 while the neutrals give a pH of 5.0–6.0 enables one to make a separation of these two groups with an anion exchange material if no foreign cations are present.

The problem of separating the basic- from the neutral- and acidic amino acids by way of the cation exchange bed is not as simple as might appear from the above, and likewise the problem of separating the acidics from the neutrals by way of the anion exchange bed.

One of the difficulties is that, unless the mixture of acidics and neutrals fed to the anion bed is free from cations, the separation will be incomplete. For example, if an amount of $Na^+$ or $NH_4^+$-ions equivalent to 1% and the acidics is present, that amount of acidics will pass into the neutrals fraction, thus causing not only tantamount loss of acidics but also a proportionate contamination of the neutrals fraction by that amount of acidics and of $Na^+$- or $NH_4^+$-ions. The present invention therefore provides that the feed solution supplied to the anion exchange bed be substantially free from cations.

This invention teaches how to produce in primary separation this cation-free feed solution for the anion exchange bed of the secondary separation operation. Accordingly, an effluent mixture of neutrals and acidics containing the equivalent of less than 1% of the acidics present is obtained, and control may be exercised whereby 0.1% is obtainable.

The pH of the effluent from the cation exchange bed is markedly influenced by the presence of cations; hence pH measurements on the effluent serve as a basis for control.

If the electrodes of the pH indicator are placed in the bottom section of the bed, or if a small stream of solution is bled from a point somewhat above the bottom and run through the pH indicator, the pH indications will warn the operator of the approach of the cation breakthrough so that he may prevent undue contamination of a desired effluent fraction.

With respect to the conduct of the operation of the various exchange treatment steps of this process, the invention also provides that certain cuts be made between displaced void water and pregnant solution flowing from the bed at the beginning of a step, as well as between the pregnant solution and the excess rinse water at the end of the step. An additional amount of barren solution that follows the effluent of void water from an exchange bed in certain steps can be sent to waste with a consequent reduction or elimination of the evaporation load.

According to one feature one fraction comprising the acidic- and the neutral-, and another fraction comprising the basic amino acids are obtained from a mixture by Unloading the acidics- and the neutrals fraction from the cation bed with a solution substantially containing cations of a volatile salt along with anions which are non-contaminating with respect to the amino acids, for example $OH^-$, glutamate−, aspartate−, $HCO_3^-$, $CO_3^=$, and then Stripping the basics fraction from the cation bed with a solution of the volatile salt, for example ammonium carbonate or bicarbonate with the addition of $CO_2$.

Another feature to effect the recovery of an acidic and a neutral amino acid fraction per se from a mixture provides for passing the mixture through a bed of alkali-regenerated anion exchange material whereby the acidic amino acids are selectively retained in the bed while the neutrals are passed off as effluent, and then alkali- regenerating the exchange bed to remove the acidics as salts in the resulting effluent solution.

According to another feature the acidic amino acids are liberated or reconstituted from their salts, such as glutamate or aspartate, by passing the effluent solution from the anion exchange bed through a hydrogen-ion regenerated bed of cation exchange material.

Another feature lies in purifying acidic and neutral amino acids in a solution containing contaminating cations.

Still another feature lies in purifying a solution mixture of acidic and neutral amino acids or freeing it from basic amino acids contained in the mixture.

The impure mixture of the groups of amino acids is passed through a bed of the acid-regenerated cation exchange material which is capable of becoming loaded indiscriminately with quantities of all groups as well as with contaminant cations.

A non-acid unloading solution of alkaline reaction having non-contaminating anions, such as $NH_4OH$, is then passed through the cation exchange bed for effecting the primary separation of the group of basic amino compounds from the groups of acidic- and neutral amino compounds by selectively displacing them from the bed with a solution of $NH_4OH$, but not the basics which resist displacement by that solution and are held residual on and by the bed.

The selective displacement of the acid and neutral amino compounds is explainable as follows:

The combination of the cation exchange material with the acidic and neutral amino acids may be considered as a salt in which the exchange material represents the anionic part while the amino acid represents the cationic or basic part. Whereas weak bases are displaceable from their salts by stronger bases, therefore the acidic- and the neutral amino acids being but feebly basic are readily displaceable by the more strongly basic unloading chemical such as $NH_4OH$. By contrast, the basic amino acids because of their much greater basicity are very much more resistant to such displacement and therefore remain residual in the bed.

As the resultant effluent solution containing selectively displaced acidic and neutral amino acids passes from the bed, an intermediate portion or fraction thereof, herein termed the production fraction, is collected containing the (taste-imparting) acidics as well as the (nutritional) neutrals in the form of their acids and substantially free from contaminant cations as well as from $NH_4^+$-ions. The use of an alkali, for example $NH_4OH$, as the unloading solution proposed by this invention furnishes an exceptional criterion for rendering the fractionation accurate, that is with respect to a desired degree of purity and relatively high concentration of the production fraction, for the reason that it provides a characteristic $NH_4^+$-breakthrough in a charted curve representing characteristic guide points in the pH-change of the resultant effluent solution. The qualities in the production fraction as to purity and concentration are important for rendering efficient the secondary separation, namely the separation of the acidics from the neutrals in the production fraction of the mixture.

The residual (nutritional) basic amino compounds are stripped from the cation exchange bed by means of a stripping solution of a salt and more preferably of a volatile salt, namely a carbonate or a bicarbonate of ammonium, it being notable that the cation of this stripping solution is of the same kind as that of the preceding hydroxide unloading solution of NH4OH. At any rate the residual basics are thus being stripped from the cation exchange bed by means of a salt solution whereas the acidics and neutrals had been unloaded from the bed by means of an alkaline solution.

Next, the production fraction representing a relatively cation-free and relatively concentrated solution of acidics and neutrals now in the form of their acids having resulted from the primary separation, is subjected to the secondary separation whereby to isolate (taste-imparting) acidics from (nutritional) neutrals, this in consideration of the fact that the acidics are much more strongly acid than are the neutrals. In fact, the neutrals are so weakly acid that the anion exchange material employed will not to any significant degree intercept and hold them, whereas the acidics because of their greater acidity are intercepted and held by this material.

This secondary separation as between the acidics and the neutrals takes place as the cation free production fraction of their mixture passes through a bed of alkali-regenerated anion exchange material with this bed retaining the acidics while rejecting the neutrals, the latter passing substantially pure from the bed in the resulting effluent solution.

The retained acidics are removed from the anion exchange bed by means of an alkali solution such as NH4OH being passed through the bed and producing an effluent solution containing the removed acidics as alkali salts. An intermediate effluent portion or fraction containing NH4+-salts of the acidics substantially free from NH4OH is collected as a production fraction to be subjected to a treatment whereby these alkali salts are converted or reconstituted to form the acidic amino acids proper.

That is to say, the production fraction of these alkali salts of the acidics is subjected to what is herein termed the liberating operation by being contacted and treated with acid-regenerated cation exchange material which reconstitutes these salts so as to form the desired acidic amino acids proper in which form they pass from a bed of such material in the resulting effluent solution.

This effect of reconstituting the acidics as acidic amino acids as such will be more clearly understood as follows:

When the alkali salts of the acidic amino acids pass through a freshly acid-regenerated bed of cation exchange material, both the salt cations (NH4+) and the acidic amino acids of the salts are retained by the bed. But the exchange material of the bed discriminates against the amino acids in favor of the salt cations, the material having greater affinity for the cations than for the amino acids, so that the salt cations will occupy the influent end portion of the bed, while amino acids will occupy a portion of the bed subjacent to the salt cations. Because of this preference of the exchange material more and more of the bed becomes saturated with cations while more and more of the amino acids are being displaced from the bed by the salt cations, until finally the bed will have become exhausted by the salt cations. As the acidic amino acids are thus being displaced from the bed, they constitute and can be intercepted in an effluent production fraction in which they are contained at relatively high concentration and pure. These qualities of purity and concentration of the production fraction free from NH4-ions are attainable with the aid of an exceptional criterion which presents itself in the NH4-breakthrough with the attendant sharp change of the pH of the effluent solution of which the production fraction is a part.

In order to preclude undesired crystallization of the acidic amino acids from a solution thus relatively highly concentrated, the feed solution of alkali salts of the acidic amino acids is passed to and through the bed at a sufficiently high temperature level.

With the aid of the pH-criterion just mentioned the intermediate production fraction of this effluent solution is collected for and may be subjected to crystallization treatment for yielding acidic amino acids in crystalline form. However, mother liquor resulting from the crystallization operation is utilized by being passed through an acid-regenerated cation exchange bed in a subsequent operation leading towards the reconstituting of the acidic amino acids such as above set forth.

This invention presents a process for treating an aqueous solution mixture of amino acids or protein hydrolysate so that a substantially full and direct recovery is made of each of the respective amino fractions per se, namely, of the acidics, the neutrals, and the basics, each substantially pure.

In summary, this invention calls for first loading all amino acids indiscriminately onto an acid-regenerated cation exchange bed thereby separating the amino acids from their carrier solution, then selectively unloading the acidic- and the neutral amino acids combined by means of ammonium hydroxide, and thereafter stripping from the bed the residual basic amino acids by means of ammonium carbonate or -bicarbonate.

A characteristic in the conduct of the process comprising this combination of treatment steps lies in collecting a first fraction or portion of the unloading effluent solution by the criterion of the abrupt increase or break in the rate of pH-change when the NH4+-ions break through, and collecting a second fraction or portion of the effluent solution obtained subsequent to such break; the first fraction contains the acidics and the neutrals significantly pure and thus suited to be directly processed as in a bed of anion exchange material for separating the acidics from the neutrals with the acidics being retained by the bed so they can be liberated from the bed pure by alkali regeneration of the bed; the second effluent fraction contains along with acidics and neutrals some of the basics together with unspent NH4+, and this fraction is employed to help in a subsequent unloading operation.

Even though the unloading solution and the stripping solution each have their specific characteristics to effect unloading and stripping respectively as conceived by this invention, in order that full recovery may be had of the acidics and of the neutrals in a pure state, it is necessary to accept a degree of admixture of basics to the acidics and neutrals which occurs past the NH4+-breakthrough point and such admixture is to be dealt with in the manner according to the concept of this invention. That is to say, the mixture of acidics, neutrals, basics and NH4+ contained in the second unloading effluent fraction is employed to serve in a subsequent unloading, whereas the acidics and neutrals in the first collected effluent fraction are significantly pure and can be separated from one another as is. In this way, the acidics and neutrals are fully unloaded from the bed and are obtained each isolated and pure, namely uncontaminated by either basics or by $NH_4^+$. Thus the invention provides that there be no acidics and neutrals left on the bed at the time of stripping the basics, yet that no basics will appear admixed in either the acidics or in the neutrals.

In loading, the starting solution or protein hydrolysate is passed through a bed of acid-regenerated cation exchange material whereby there is effected a separation of all the amino compounds from its carrier solution by indiscriminately loading the acidics, neutrals, and basics onto the bed, preliminary to their being selectively recovered directly and fully therefrom in a pure state.

In unloading, the unloading solution (ammonium hydroxide) or base ammonia with a pH above 7.0, being but slightly ionized acts by the mechanism of displacement. That is to say, the combination of acidics and neutrals with the exchange material behaves like salt of very weak bases; from such a combination the acidics and neutrals are readily displaced by the stronger base $NH_4OH$. That is, by displacement weak bases are rendered into their non-cationic form in which they are not held by the exchange material and are eluted while the stronger base passes into its cationic form and is held by the exchange material in place of the eluted weak bases. However, this mechanism of displacement leaves the basics substantially unaffected except to some extent after the $NH_4^+$-breakthrough when some basics and un-utilized $NH_4^+$-ions appear in mixture with acidics and neutrals in the effluent solution. Thus the effluent solution collected in a first fraction (with $NH_4^+$-breakthrough as a criterion) contains unloaded acidics and neutrals in a pure state, and collected in a second fraction contains unloaded acidics and neutrals in mixture with some basics and with un-utilized $NH_4^+$. The first or pure fraction may be sent to a bed of alkali-regenerated anion exchange material which retains the acidics and passes the neutrals, the retained acidics to be liberated by alkali regeneration. Notably, the second or mixed fraction is employed to help in a subsequent unloading operation wherein the basic amino acids being more strongly basic than the neutral and acidic amino acids, act as unloading reagent in conjunction with un-utilized $NH_4^+$ to help elute acidic and neutral amino acids from the bed.

In stripping, ammonium carbonate or -bicarbonate is used as a stripping solution which is highly ionized presenting a high concentration of available cations to act effectively by way of direct ion-exchange as distinct from the mechanism of displacement, so as to have the basics yield as ammonium salts although in mixture with volatilizable and removable $NH_4OH$ in the effluent. Thus the stripping solution differs in character and effect from the unloading solution which is substantially non-ionized and has little or secondary effect upon the basics on the bed.

In brief, this invention presents a process which effects the separation of an aqueous solution mixture of amino acids contained in a protein hydrolysate into groups of acidic-, neutral-, and basic amino acids respectively by treatment with ion exchange material. This mixture or protein hydrolysate is first subjected to the loading step whereby it is passed through a bed of acid-regenerated cation exchange material for absorbing thereon the amino acids indiscriminately from the solution while impurity anions pass in the effluent from the bed. Thereupon the acidic- and the neutral amino acids are selectively unloaded by displacing them from their combination with the exchange material by passing through the bed an unloading solution comprising ammonium hydroxide as a base to effect converting the acidic- and the neutral amino acids but substantially not the more strongly held basic amino acids into non-cationic form in which they are eluted from the exchange material whereby the material is left containing basic amino acids along with $NH_4^+$-cations while the acidic- and the neutral amino acids are obtained in the effluent as displaced free amino acids. Meanwhile the resulting effluent solution from this cation exchange bed is collected in a first fraction up to a point defined substantially by a point of abrupt increase in the pH-change of the effluent solution, which first fraction contains acidic- and neutral amino acids substantially pure, namely uncontaminated by $NH_4^+$-cations. Following this first fraction there is collected a second fraction of the effluent solution containing substantially the remainder of the acidic and the neutral amino acids although contaminated by $NH_4^+$-cations from the unloading solution and also mixed with a minor quantity of the basic amino acids displaced by the unloading solution while a major quantity thereof remains on the bed.

Then follows the stripping step which effects the stripping of the basic amino acids from the bed by passing through the bed a stripping solution comprising as stripping reagent a salt of a group consisting of ammonium carbonate and -bicarbonate providing a high concentration of ammonium cations as distinct from the base ammonia which is not highly ionized in solution for effecting ionic exchange as between the ammonium cations and the cationic basic amino acids on the bed whereby there result in the effluent the basic amino acids as salts together with volatile molecules of excess stripping reagent, which stripping reagent is separable from the basic amino acid salts by volatilization. This second effluent fraction is then employed in addition to the aforementioned unloading solution in a subsequent unloading operation whereby acidic and neutral amino acids in said fraction are recovered while $NH_4^+$ as well as the basic amino acids therein act as unloading agents.

The invention is illustrated diagrammatically or symbolically in the accompanying drawings in which various steps of the process of this invention are indicated.

Figs. 10 to 16 represent momentary chemical conditions of the three ion exchange beds;

Fig. 17 represents an operational control graph for the Unloading step.

Fig. 18 represents an operational control graph of pH-criteria for conducting the Liberating Step.

Fig. 20 represents Steps I to VI in terms of Ion Exchange Equilibrium Equations.

Figure 21:
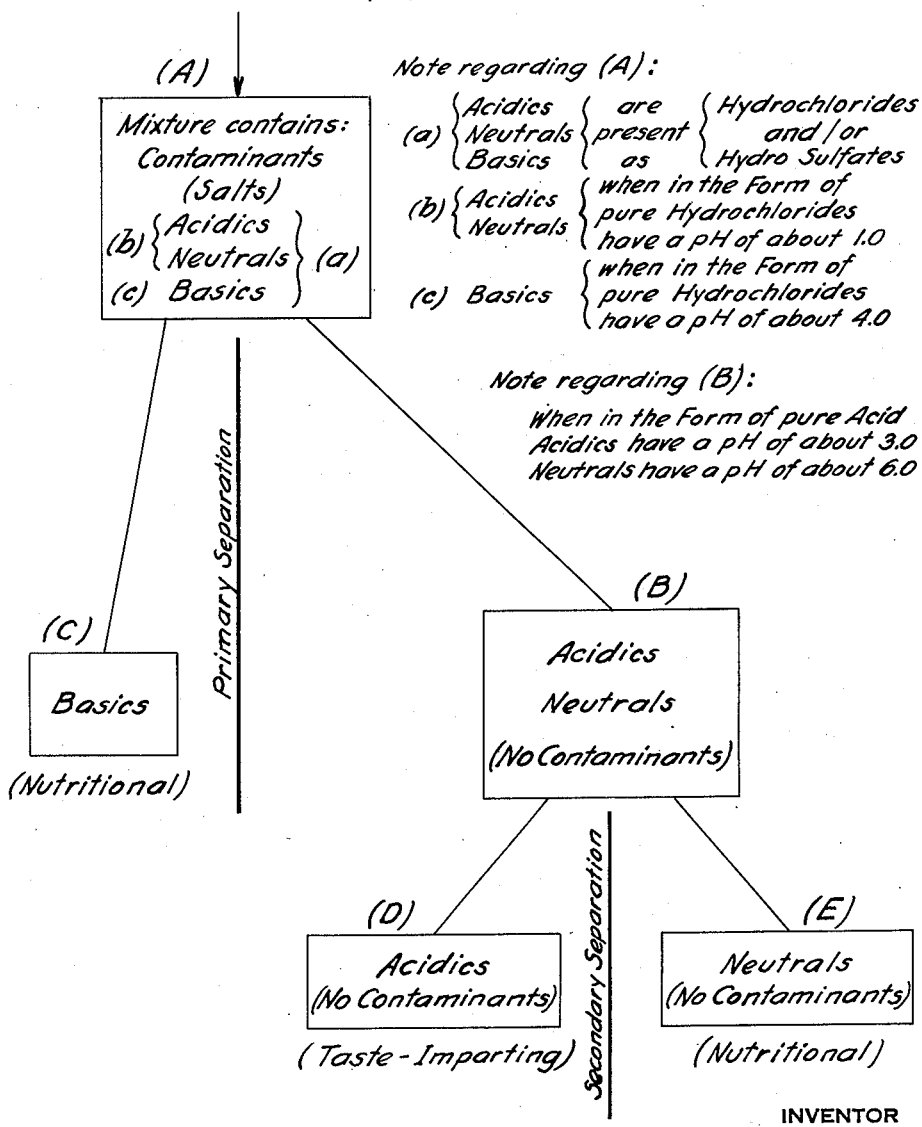

Fig. 21 presents diagrammatically the overall concept of the process in terms of the Primary and the Secondary Separation of the amino compounds.

Figure 22:
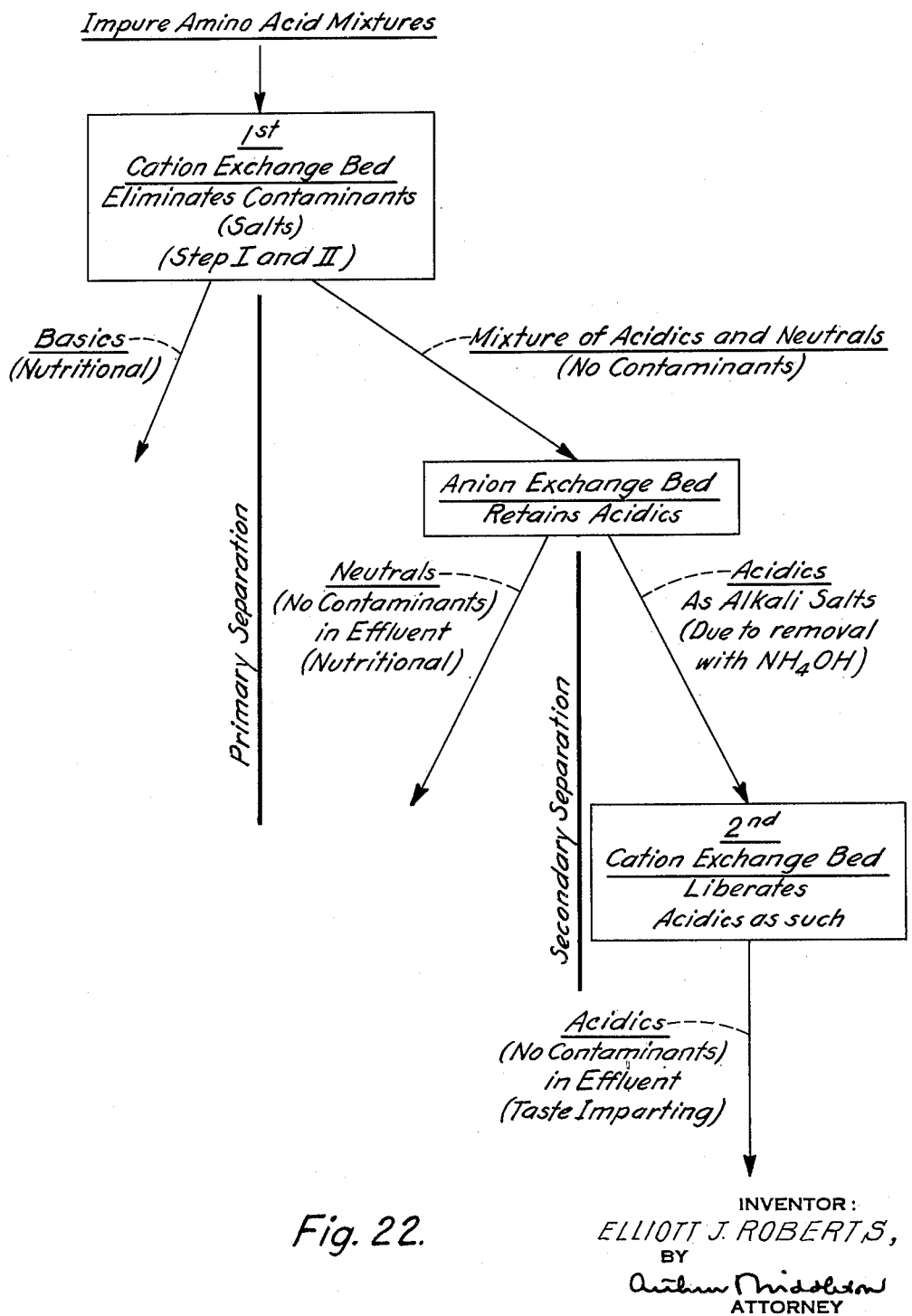

Fig. 22 presents the overall concept of Fig. 21 although in terms of ion exchange stations.

The Fig. 21-flowsheet conveys broadly the relationship between the Primary separation and the Secondary separation of the respective amino acids; namely primary separation of a mixture (A) of contaminants (salts), acidics, neutrals, and basics into cation-free acidics plus neutrals as one primary fraction (B) and basics as the other primary fraction (C), and secondary separation of the mixture of cation-free acidics and neutrals into acidics as one secondary fraction (D) and neutrals as the other secondary fraction (E). Thus the largely taste-imparting acidics such as glutamic and aspartic acids will have been separated from the largely nutritional neutrals and basics.

The Fig. 22- flowsheet, like Fig. 21, presents the overall relationship between the Primary and the Secondary separation of the respective amino acid groups, but implemented by ion-exchange stations; namely a 1st cation exchange bed for primary separation whereby a mixture of acidics and neutrals is separated from the basics, an anion exchange bed for secondary separation whereby acidics (although in the form of alkali salts) are separated from the neutrals, and a 2nd cation exchange bed whereby the acidics are liberated or reconstituted from their alkali salts.

Figure 1:
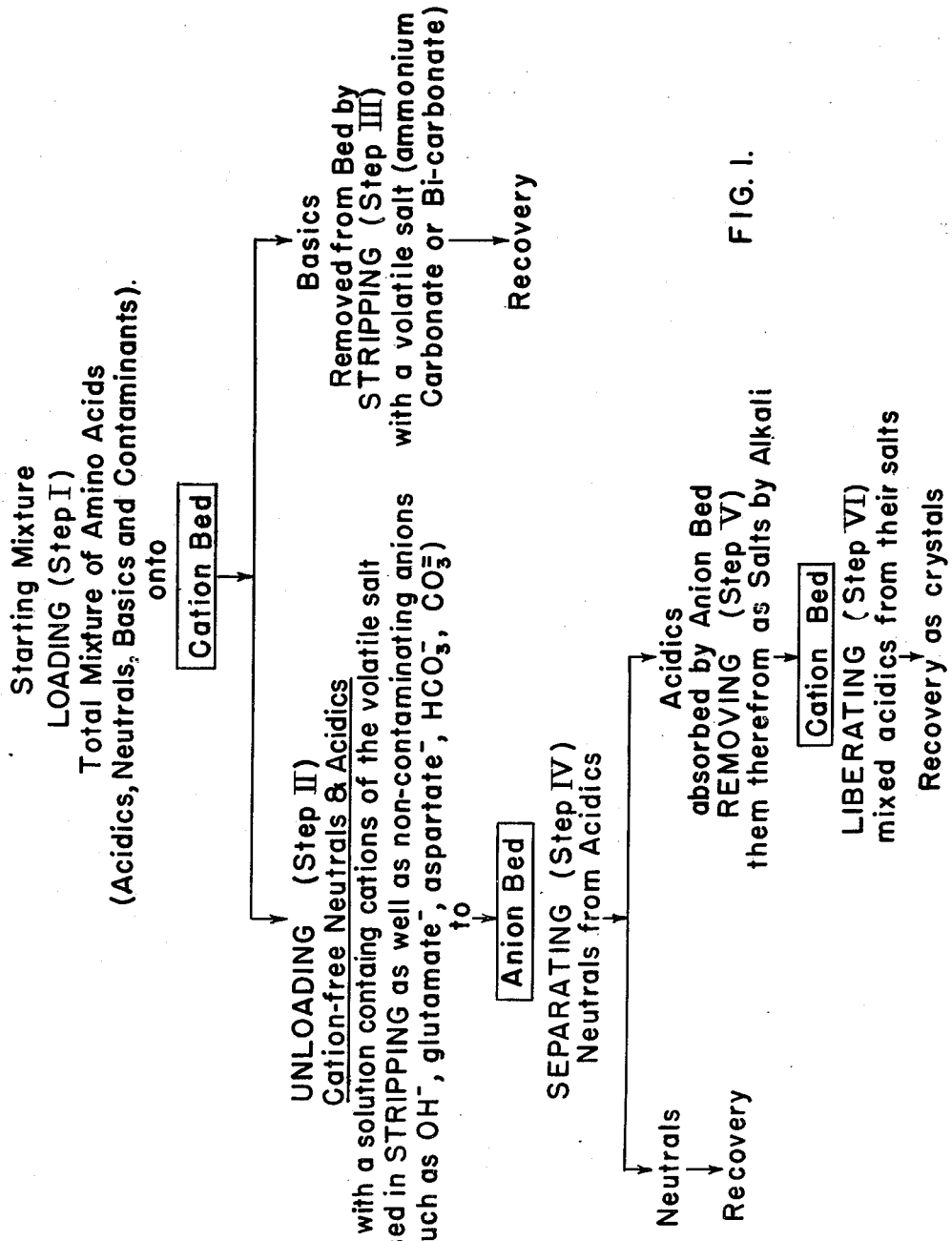
Fig. 1 is a treatment diagram illustrative of the major steps of this invention involving the recovery per se of the acidics-, the neutrals-, and the basics fraction.

The operation according to the Fig. 1-flowsheet while concerned with recovery of the acidics, the neutrals, and the basics as isolated fractions, is more explicit as to the character of the treatment steps than is the Fig. 22-flowsheet.

In Fig. 1 the starting material preferably has a high content of amino acids so by way of illustration there is herein proposed the use of hydrolyzed or acid-digested soy bean meal after oil has been extracted therefrom. The result is a hydrolysate rich in amino acids and wherein the environment of the acids has been changed so that their separation from their environment and from each other is rendered possible. Such hydrolysate or other solution of amino acids is passed through a bed or column of cation exchange material loading the same (Step I).

Thereupon the primary fractionation begins by passing suitable displacing solutions through the bed. One such solution displaces or unloads from the bed that primary fraction which includes the neutrals and acidics which pass as effluent along one flowpath from the bed (Step II). A portion of the effluent is recycled in order to obtain this fraction—neutrals plus acidics—substantially cation-free.

The alkaline unloading solution contains the cations of the same kind that are contained in the volatile salt that is being used in the stripping operation and non-contaminating anions such as $OH^-$, $glutamate^-$, $aspartate^-$, $HCO_3^-$, $CO_3^=$.

Another such solution subsequently displaces or strips from the bed that fraction which includes the basics which have remained in the bed and which now pass as effluent along another flowpath from the bed (Step III), whereupon they may be subjected to treatment whereby they are recovered in concentrated form.

To effect the recovery of the basics by stripping, the solution is that of a volatile salt such as ammonium carbonate or bicarbonate.

In order to effect the secondary fractionation or separation as between the neutrals and the acidics, the primary fraction containing them in mixture is then flowed through a bed of anion exchange material with the result that the neutrals separate and emerge in the effluent passing along one flowpath from the bed (Step IV), while the acidics are left behind being held sorbed by the bed. A suitable displacing solution passed through the bed displaces the acidics thus being carried along another flowpath in the effluent passing from the bed (Step V).

The two secondary fractions, that is the neutrals on the one hand, and the acidics on the other, may then be individually subjected to treatment whereby they are recovered in crystalline or concentrated form, or they may first be further fractionated.

The operation according to one embodiment of this invention is concerned solely with the recovery of the neutrals and of the acidics as fractions. Hence the solution to effect Unloading is defined as a non-acidic solution of non-contaminating anions such as $OH^-$, $glutamate^-$, $aspartate^-$, $HCO_3^-$, $CO_3^=$. The subsequent steps of Separating (Step IV), Removing (Step V), and Liberating (Step VI) correspond to similarly identified steps in the Fig. 1 embodiment.

An unloading solution suited for the present purpose contains cations selected from the group consisting of ammonium, alkali metals, alkaline earth metals and basic amino acids, and non-contaminating anions. The non-contaminating anions for the present purpose are those which in the course of the process form water or which are volatile and can, therefore, be readily eliminated, or which are amino acids, and which do not form insoluble precipitates with any of the cations present.

At present only one of the amino acids has commercial value in some other than the nutritional field, that is glutamic acid which in the form of its sodium salt is used widely as a flavoring agent. While the other amino acids are of value nutritionally, only ten of them are at present considered essential for human subsistence. These are histidine, lysine, arginine, valine, leucine, isoleucine, threonine, phenylalanine, tryptophane, and methionine. Of these arginine does not appear to be essential in the adult, and histidine may be dispensable in humans.

Most proteins contain all of the amino acids in Table A in varying proportions. Gluten wheat is rich in glutamic acid and low in lysine. When glutamic acid is manufactured from gluten (which is at present one of the chief commercial sources) all of the other amino acids may be discarded since, due to their low lysine content, they are not worth purification. Most present-day medical (nutritional) preparations of the amino acids are derived from casein or other milk proteins. Casein contains the essential amino acids in desirable proportions and is readily obtained in a rather pure state which is highly desirable when using present-day methods of processing to produce the hydrolysate.

Soy bean meal (after extraction to remove oil) is a much cheaper source, containing nitrogen equivalent to 44% of protein, and 5.4% lysine based on 16% N according to Block, while casein contains 6.9%. It is one of the objects of this invention to isolate glutamic acid from soy meal and then to produce cheaply the nutritional amino acid mixture from a cheap source. By removing the acidic amino acids from soy meal hydrolysate, the lysine concentration in the finished concentrate should be as high as that made from casein. Again, if casein could be used as a cheap enough source, the removal therefrom of the acidics would increase the lysine concentration by 40%.

In order to separate the glutamic acid from the other amino acids it is necessary first to make a separation of the neutral and acidic amino acids from the basic amino acids and other bases. Thereafter the neutrals and acidics can be separated from each other. After the three groups have thus been isolated, the neutrals and basics can be combined for nutritional end uses, while the acidics could be processed to produce flavoring substances.

Proteins can be broken down into a mixture of amino acids by means of enzymes, alkalies, or strong acids. The invention underlying the present process of fractionating certain amino acids or amino acid groups from a mixture is concerned particularly with such a mixture or protein hydrolysate which has been produced by strong-acid hydrolysis. Concentrations of hydrolyzing acids frequently employed in protein hydrolysis are, for example, 20% (6 N) HCl or 25% (6 N) $H_2SO_4$. As a net result the acid is not actually consumed by the hydrolysis reaction although the hydrochlorides or hydrosulfates of the amino acids are formed, the real purpose of the hydrolyzing acid being to introduce water into the bonds which tie up or interlock the amino acids in the protein.

For the purpose of the present process of fractionating amino acids or amino acid groups it is advantageous to have the protein source as free from metallic cations as possible since their presence will make themselves felt in the later phases of the operation when they appear as a contamination in the basics fraction and must be dealt with by way of some suitable elimination treatment if the desired pure crystals of the basic amino acids are to be derived from this process. Among the impurities potassium, for example, is commonly present in natural plant substances that constitute the source of the protein.

It appears that the amino acids of protein hydrolysate representing a solution mixture of the amino acids as well as of various organic as well as inorganic and also ionized as well as non-ionized impurities, load onto an acid-(H-ion) regenerated resinous cations exchange material with about equal facility from either $H_2SO_4$ or HCl solutions. I have found that the ratio of the concentration of $H_2SO_4$ or HCl to the amino acid concentration has an important bearing on the capacity of the exchange bed with a given amount of recycle mixture and hence upon the economics of the process. I have found that the lower this ratio the higher is the bed capacity, and I therefore propose to use as little acid as possible in the hydrolysis of the natural protein, although sufficient acid should be used to obtain complete hydrolysis along with humin of good filtering qualities.

HCl and $H_2SO_4$ when used as hydrolyzing acids each present their individual advantages and disadvantages. That is to say, HCl as a hydrolyzing acid is difficult to work with and is relatively expensive although the quantity required is smaller than the required quantity of $H_2SO_4$. With HCl as the hydrolyzing acid, the effluent from the cation exchange bed resulting from the loading phase (Step I) can be reused for hydrolysis after it has been subjected to a recovery treatment wherein most of the water is distilled off and then a 15% to 20% HCl solution distilled and condensed for reuse in another protein hydrolysis.

$H_2SO_4$ as hydrolyzing acid is uneconomical to recover for reuse as a hydrolyzing agent, but for otherwise good economy I propose to recover and reuse a quantity thereof in the acid regeneration of the cation exchange bed.

In the hydrolysis operation a large excess of hydrolyzing acids appears to do no harm, but the minimum quantity is controlled by three factors:

(a) There should be enough liquid present in the hydrolysate to produce a fluid mixture which is capable of being handled mechanically.

(b) There should be sufficient acid present to produce a humin residue (forming from the carbohydrate material present in the protein) that is readily filterable.

(c) It appears that there must be present at least one molecule of HCl and $H_2SO_4$ for each molecule of amino acid; hence, 2 equivalents of $H_2SO_4$ are required against 1 equivalent of HCl, this presumably because the second hydrogen ion of $H_2SO_4$ is weaker.

Relatively lower concentrations of hydrolyzing acid can be used if the above three factors (a), (b), and (c) are satisfied although a longer period of time is required for the performance of this operation.

With 6 N $H_2SO_4$, about 24 hours of boiling at 1 atm. pressure gives satisfactory results. However, if the temperature is increased by an increase of pressure to 15 lbs./per square inch, substantially complete hydrolysis appears to result in about three hours. I have determined that roughly about 2.5 lbs of 6 N $H_2SO_4$ are required per pound of crude protein to satisfy conditions (a) and (b). However, where the protein is very pure this will not furnish sufficient $H_2SO_4$ to satisfy condition (c).

As a source of the amino acids, naturally occurring solutions of the same may be used; also enzymatically hydrolyzed solutions if such solutions do not contain substances harmful to the exchange beds. Such naturally occurring solutions may include sugar juices derived from beet or cane.

Figure 2:
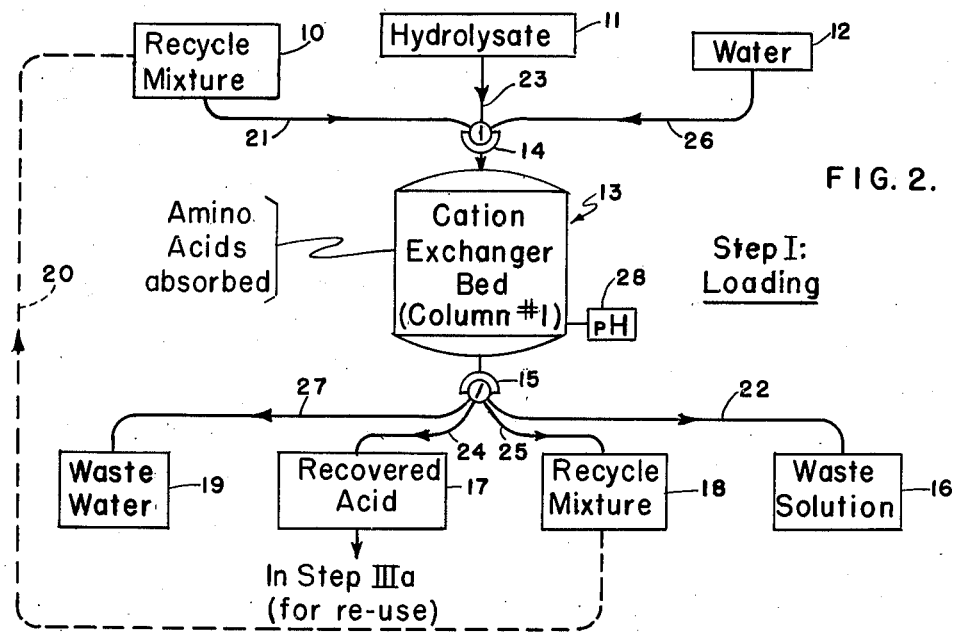
Fig. 2 shows Step I, namely, Loading the cation bed.

*Loading (Step I).*—The term Loading connotes the absorbing of the amino acids from a hydrolysate on a cation exchange bed and recovering acid for reuse be it for hydrolysis or for regenerating purposes. In Fig. 2 there is diagrammatically illustrated the loading step or phase whereby the total mixture of amino acids is collected upon a bed of cation exchange material herein also briefly termed cation bed, from the protein hydrolysate.

This loading phase comprises the sequential passing through the cation bed of influent recycle mixture 10, of fresh or crude hydrolysate 11, and of rinse water 12, into a tank 13 containing a bed of acid-(H-ion) regenerated resinous granular cation exchange material.

All of the exchange cation resins currently used in the deionization of water appear to work satisfactorily. However, those with the highest capacity will, in general, be most economical. Further economic advantage is obtained by choosing a resin which consumes the least quantity of ammonia per equivalent of amino acid held. Such resins are characterized by having substantially the same capacity with respect to $NaHCO_3$ and $NaCl$ when applied in the ionic purification of water.

The selective or sequential feeding of these solutions into the tank and through the bed is represented by the showing of a three-way valve 14 operable to selectively connect the influent of the tank with the respective flowpaths along which the respective solutions are to be passed to the tank.

The resulting effluent can be fractionated by passing selected volumes thereof sequentially along four separate flowpaths as indicated by a four-way valve 15. Depending upon where the cuts are made in the effluent solution the respective effluent fractions comprise waste solution 16, recovered acid 17, effluent recycle mixture 18, and waste rinse water 19. A recycle flowpath 20 (shown in dotted lines) leading from effluent recycle mixture to influent recycle mixture is not to be taken literally for the reason that the influent mixture in reality is represented by the effluent mixture containing unabsorbed amino acids from a preceding treatment or Loading operation. That is to say, recycled mixture from a preceding Loading operation is retreated in a subsequent Loading operation, that is in effect countercurrently.

According to Fig. 2 the recycle mixture thus derived passes along a flowpath 21 and by way of the three-way valve 14 into the tank 13. After passing through the freshly regenerated cation exchange material in the tank the solution leaves the tank by way of the four-way valve 15 substantially free and relieved of its residual amino acids which now have been absorbed or collected by the bed or loaded into it the resulting effluent being collected along flowpath 24 as recovered acid 24. Void water displaced from the bed by the recycle mixture would normally be diverted along flowpath 27 to waste. A small amount of acid may also be wasted here in order to maintain the concentration of the recovered acid. Fresh or crude protein hydrolysate, herein also briefly termed hydrolysate 11, then passes along a flowpath 23 through the bed.

As hydrolysate is passed, effluent is collected as recovered acid for about 1 void volume at which time valve 15 is turned to divert the effluent via path 25 to provide recycle mixture 18. In a well-balanced operation, the leakage of amino acids will begin to be appreciable at the time valve 15 is turned. Hydrolysate feed is continued until, in balanced operation, a definite but negligible leakage of amino acids occurs at the end of the recovered acid fraction. This insures maximum utilization of the bed capacity in each cycle.

Rinse water 12 along flowpath 26 then enters the bed to displace residual recycle mixture and eventually to produce an effluent fraction to be diverted along flowpath 22 as waste solution. The recovered acid fraction is utilized in a subsequent regeneration of the cation exchange bed while the recycle mixture fraction is transferred and collected at 10 to be used in a subsequent Loading operation.

A pH indicator 28 is provided at the effluent end of the tank whereby the condition of the effluent as well as of the bed may be judged. pH diagrams or plots can thus be made of the operation, which criterion together with volumetric determinations of the effluent enables an operator to properly conduct the operation. While pH indication is not an indispensable criterion in the Loading step it does show up critical phases in those subsequent steps of the operation which require careful fractionation of the effluent.

I have discovered that the amino acids may be efficiently absorbed on a cation exchange bed in the hydrogen cycle even in the presence of a high concentration of acid (HCl or $H_2SO_4$). The absorption occurs while acid (HCl or $H_2SO_4$) is being released in an amount more than equivalent to the amino nitrogen. The placing or Loading of the amino acids on the cation exchange bed as well as their displacement or removal therefrom by an alkali ($NH_4OH$ is not in the nature of ordinary cation exchange operations. The loading of the amino acids is an additive reaction, while the fractional removal by the alkali is brought about by converting them into zwitter ions, a kind of ions having an equal number of positive (+) and negative (—) charges. By contrast, in ordinary cation exchange processes one positive ion merely displaces another positive ion while balancing anions are always present.

After the bed has been loaded with a mixture of amino acids, it must be rinsed free of residual solution by means of water that has been freed of ionized matter by ion exchange treatment. Additional rinse water may then be applied in quantities sufficient to remove or slough off from the cation exchange bed as much non-formol-pH 3.3 to 7.0 titrating material as possible prior to the subsequent treatment steps, in order to avoid contamination of the acidic amino acids, although a certain amount of this impurity can be eliminated in a later phase of the treatment operation (Step VI). The rinsing with de-ionized water thus removes such impurity in the beginning of the process so as to get it out of the way as early as possible in the treatment operation with no sacrifice of amino acids.

*Unloading (Step II)*.—The term Unloading connotes the removing of the neutral and the acidic amino acids jointly from the cation exchange bed uncontaminated by basic amino acids or other cations.

Figure 3:
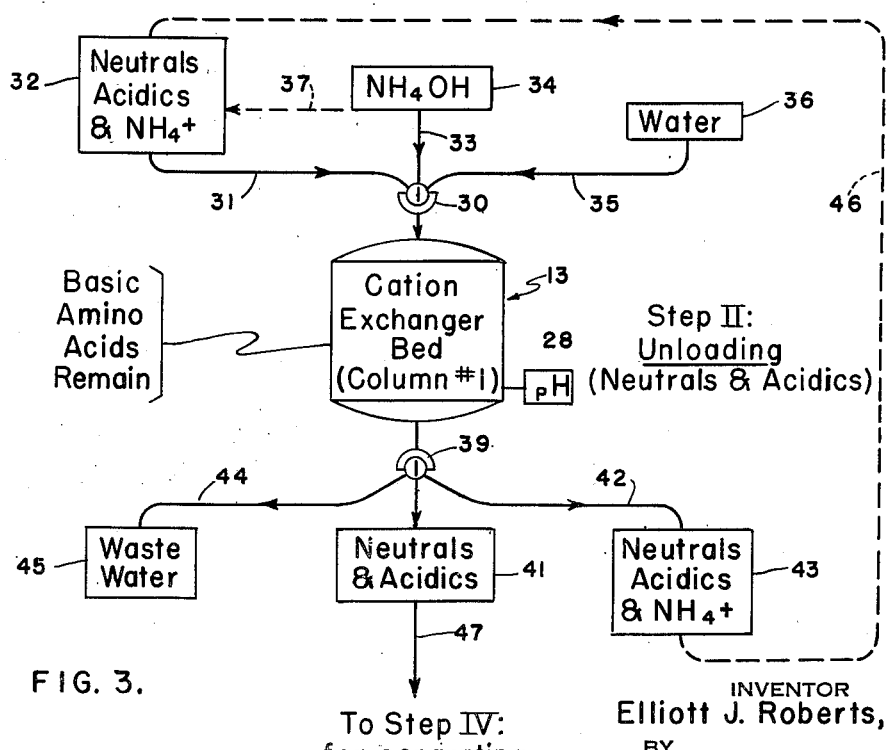
Fig. 3 shows Step II, namely, the Unloading from the cation bed of the neutrals and the acidics jointly.

In Fig. 3 there is diagrammatically illustrated the unloading step or phase whereby the neutrals and acidic acids together are selectively removed as the one primary fraction from the cation bed while the basics are being retained by the bed.

The tank 13 containing the bed of granular cation exchange material loaded as in Step I is provided with a three-way valve 30 at its inlet and whereby the feed inlet end of the tank is connectible selectively with a feed flowpath 31 for passing recycle solution 32 containing neutrals, acidics and $NH_4^+$, or with a flowpath 33 for passing fresh $NH_4OH$ Unloading solution 34, or with a flowpath 35 for passing rinse water 36 which may be de-ionized. A flowpath 37 (in dotted line) is shown to indicate an alternative mode of operation whereby fresh $NH_4OH$ may be admixed to the recycle mixture prior to passing it through the bed.

The outlet end of tank 13 has a three-way outlet valve 39 through which the outlet end of the tank is selectively connectible with a flowpath 40 to pass the effluent fraction of pregnant solution containing the bulk of the neutrals and acidics 41, or with a flowpath 42 to pass effluent solution following the $NH_4^+$-breakthrough and therefore containing neutrals and acidics and $NH_4^+$ in mixture 43, or with a flowpath 44 to pass void water and barren solution 45 to waste. A recycle flowpath 46 is shown (in dotted lines) to indicate reuse of the mixture from flowpath 42 as initial or recycle solution 32 to be used in the initial part of the Unloading step of the next operating cycle.

A flowpath 47 is indicated whereby the neutrals and acidics mixture may enter a subsequent Separating phase or step whereby in turn the neutrals are fractionated from the acidics (to be explained below). A pH indicator 28 is provided at the effluent end of the tank.

The fractionated removal of the amino acids from the cation bed does not take place as completely within predetermined pH ranges as might be theoretically deduced. The neutral as well as the acidic acids (herein also briefly termed the N- and A-acids) are held by the exchange material of the cation bed much more firmly than expected. This manifests itself in that cations ($NH_4^+$, $Na^+$, etc.) start discharging or leaking through and appear in the effluent well before all of the N- and A-acids are unloaded. This difficulty can be overcome by recycling the effluent in the sense that it is passed through a freshly loaded bed whereby the neutral and acidic amino acids can be recovered free from cations.

As an unloading agent or displacing solution $NH_4OH$ is preferably used although $NaOH$ may also be used. According to one mode of unloading, the unloading agent is added to the recycle solution which already contains $NH_4OH$ together with various amounts of recycling neutral and acidic amino acids. This solution is passed through the cation exchange bed while the pH of the effluent is being watched carefully.

As soon as the rinsing has been completed at the conclusion of the loading step, the bed is ready for the unloading operation. The recycle mixture 32 of neutrals, acidics, $NH_4^+$ and $NH_4OH$ obtained from a previous cycle via flowpath 46 is passed through the bed via flowpath 31. This solution is followed by unloading agent 34 ($NH_4OH$) via flowpath 33. This solution may be around 10 N in strength in order to cut the evaporation load. This solution is washed through with water 36 via flowpath 35.

An alternative procedure is to add the unloading agent 34 to the recycle solution 32 via flowpath 37 and to pass the mixture through the bed. In this case the recycle solution 32 is followed directly by the rinse water 36.

The first portion of effluent solution issuing is water from the voids of the bed. Thereafter for a time the effluent is barren solution. Thereafter the pH of the effluent shows generally a slight rise and then continues to rise gradually incident to the removal of the neutral and acidic amino acids from the bed. Suddenly, the pH begins to rise more rapidly indicating that $NH_4^+$ or $Na^+$ is coming off the bed along with neutral and acidic amino acids. At this point the effluent must be diverted into another flowpath, to be recycled or retreated in a freshly regenerated bed. The recycle unloading solution is displaced from the bed with rinse water that has been freed of ionized solutes (herein called de-ionized water) by applying, say 5 void volumes, or until sufficient recycle effluent is collected for the subsequent operating cycle, and until the effluent is sufficiently low in $NH_3$ and amino acids.

The point of pH break or rise varies within the protein being used, since it depends upon the relative amounts of glutamic, aspartic, and various neutral amino acids.

Thence I propose (a) to divert to production only amino acids containing effluent solution at a pH below the break; (b) to recycle all of the remainder of the effluent solution for retreatment in a subsequent cycle; (c) to discard barren or spent solution in excess of the void water displaced from the bed, to lower the evaporation load to be met in later steps.

If insufficient $NH_4OH$ is used, some of the neutral and acidic amino acids will be left on the bed and will contaminate the basic amino acids subsequently to be stripped from the bed. If too great an excess of $NH_4OH$ is used, this will cause an undesirable proportion of the basic amino acids, especially histidine, to be removed from the bed into the recycle along with neutral and acidic amino acids. It is proposed to strike a balance whereby the greater part of the neutrals and acidics are removed while the amount of basics (histidine, lysine, arginine) present in the recycle solution is a reasonably low percentage of the total. From 1 to 1.5 m. eq. excess $NH_4OH$ per gram exchange material appears to be adequate to strike such a balance.

It appears to be difficult or impracticable to remove all of the neutral and acidic acids from the bed in the presence of basic amino acids. Hence it is proposed to strip the residual neutrals and acidics from the bed along with the basics and to refractionate them from the basics by an operation, for example, analogous to that of the liberating step noted in the Fig. 1 general flowsheet.

Recycling or its equivalent is important in the unloading step, in order to obtain a substantially cation-free effluent with a reasonably large production fraction of neutrals and acidics. Therefore, the effluent solution is recycled after the $NH_4^+$ breakthrough by sending it through the freshly loaded bed in a subsequent operating cycle either with or without the addition of extra $NH_4OH$; or it is treated by boiling off the excess $NH_4OH$, then passing the neutral mixture through a smaller cation bed, collecting the effluent therefrom up to the $NH_4^-$ breakthrough, and saving a volume of subsequent effluent solution for treatment on a separate still smaller bed. The barren effluent fore-run of this bed is collected and discarded, whereupon a pregnant effluent solution containing acidics and neutrals issues from the bed and is sent to the separating step. The unloading break occurs when $NH_4^+$, $K^+$ or basic amino acids begins to leak through appearing in the effluent.

A graphic plotting of the unloading step is given in Fig. 17, with the effluent pH as a function of the effluent volume in liters. This reveals that important points are two sequential breakthrough points or directional changes or changes of the shape of the curve indicating where cuts might be made to effect a desired fractionation of the effluent. In this instance the first breakthrough point is encountered at 2.72 liters effluent discharged, and the second at 5.15 liters. The first point is not very sharply defined, so it is proposed to make the cut as between barren effluent solution and pregnant or production effluent solution at the lowest point on the curve (about 2.1 liters), or at any point up to about 3 liters if one is willing to sacrifice some amino acids in return for eliminating relatively more water from this fraction which goes to production or to the Separating step. The second breakthrough point is graphically quite well defined and occurs at the point where $NH_4^+$ starts leaking through.

The pH of glutamic acid is very sensitive to small amounts of any base and any leakage of $NH_4^+$ or $Na^+$ or basic amino acid shows up immediately as represented by a change in the shape of the curve. By passing to production only that effluent solution volume that flows from the bed prior to the breakthrough, there is secured a fraction from which the acidic amino acids may be clearly separated from the neutral amino acids. Any $NH_4^+$ allowed to mix with the acidics and neutrals will interfere with the purpose of a clean separation, in that an amount of acidics equivalent to the $NH_4^+$ would be lost in the neutrals and the neutrals thereby contaminated with the corresponding amount of $NH_4^+$ and acidics.

There is no generally fixed pH for either one of the two breakthrough points $B_1$ and $B_2$, since the first one $B_1$ depends to a considerable extent upon the ratio of aspartic to glutamic acid as well as upon the presence of any loosely bound acidic compounds such as pyrrolidone carboxylic acid. Generally speaking, the curve passes through a minimum pH point before amino acids start discharging.

Therefore in the practice of this invention it is proposed to exercise important control over the unloading operation by eliminating barren effluent solution, over and above the amount of residual void water, by using as a guide the pH curve and the titration data whereby the pH curve has been correlated with the amino acid leakage in the instance of the particular material or protein hydrolysate being treated for fractionation of the amino acids.

The actual pH of the second break $B_2$ depends upon the ratio of neutrals to acidics. The curve, prior to the break, is not horizontal, as the ratio or neutrals to acidics keeps changing towards a higher ratio so that the pH rises gradually in approaching a breakthrough point. Following the breakthrough the pH rises more rapidly. In practice, in order to enable the proper cut to be made, an amount of detention is necessary between the pH point and the splitting point. While such detention may be attained as by a run of pipe, a series of tanks, etc., the desired effect can be obtained by having the pH-indicating electrodes of the pH indicators disposed in the bed of resinous exchange material somewhat above the bottom of the bed so that the approach of the breakthrough manifests itself somewhat ahead of the time that it actually occurs, giving the operator sufficient advance notice thereof.

Actually, the cut may be made prior to the actual breakthrough and the excess solution may go into recycle at no additional cost except for pumping.

*Stripping (Step III)*.—Stripping connotes the removing from the cation exchange bed of the basic amino acids as bicarbonates and thus recovering them separately from the neutral and acidic amino acids.

At the end of unloading (Step II) with $NH_4OH$ the basic amino acids are still held by the bed if the operation has been properly balanced. Since they are very valuable, it is desirable to remove and recover them.

Therefore I propose (as Step III, in Fig. 4) to pass a solution of $NH_4HCO_3$ in excess and preferably containing excess $CO_2$ through the cation exchange bed. In this instance too, recycling may be advantageously employed, that is passing an initial portion or fraction of the resulting pregnant effluent solution to production since it contains the bulk of the basic amino acids, and saving for recycling a subsequent portion or fraction of the effluent, that is for reuse in a subsequent operation, since it contains only a trailing portion of the basics, but a considerable portion of $NH_4HCO_3$. The production fraction contains the bicarbonates of the basic amino acids along with excess $NH_4HCO_3$. $CO_2$ is not indispensable in the stripping solution but its addition tends to cut down the amount of $NH_3$ held by the bed when the bed is subjected to the regeneration step (IIIa). With some exchange materials its presence may be superfluous but will do no harm. If $(NH_4)_2CO_3$ is used for stripping one cannot, of course, have any $CO_2$, stoichiometrically at least.

Figure 4:
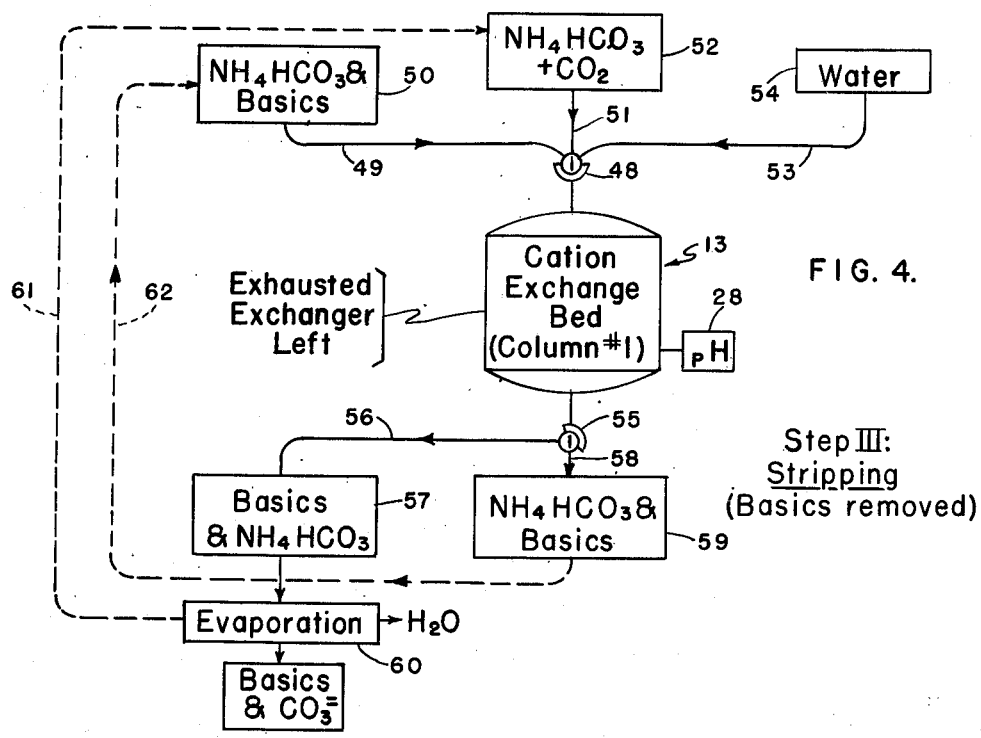
Fig. 4 shows Step III, namely, the Stripping of the basics from the cation bed.

The stripping of the residual basic amino acids by means of a stripping solution ($NH_4HCO_3+CO_2$) from the cation bed in tank 13 and their recovery as bicarbonates is diagrammatically illustrated in Fig. 4. The influent end of the tank is provided with a three-way valve 48 whereby the tank is selectively and sequentially connectible with a flowpath 49 to pass recycle used stripping solution 50 obtained from a preceding operation and containing $NH_4HCO_3$ and basic amino acids in mixture, or with a flowpath 51 to pass strong stripping solution 52 in the form of $NH_4HCO_3+CO_2$, or with a flowpath 53 to pass displacing or rinsing water 54 which may be de-ionized.

The effluent end of the tank is provided with a two-way valve 55 whereby the tank is connectible with a flowpath 56 to pass off an effluent solution fraction 57 containing the bulk of the basic amino acids and some $NH_4HCO_3$, and with a flowpath 58 to pass off a solution fraction 59 containing excess $NH_4HCO_3$ and a trailing portion of the basic amino acids. The basics fraction 57 may be passed to an evaporation station 60 effecting a three-way split up of the fraction 57, namely, into $H_2O$, $NH_4HCO_3$ (for reuse), and a basics plus $CO_3^=$ solution (for production), permitting the basics to be recovered in concentrated form and the $NH_4HCO_3$ to be reused in the main stripping phase of a subsequent operating cycle as indicated (in dotted lines) by a recycle flowpath 61. The trailing basics fraction 59 because of its considerable $NH_4HCO_3$ may be reused or recycled to serve in the initial stripping phase of the stripping operation in a subsequent cycle as indicated (in dotted lines) by a recycle flowpath 62.

In the further process of recovery of the basics the production effluent solution resulting from the stripping operation may be heated to boiling to decompose and drive off the $NH_4HCO_3$ which may then be condensed and absorbed in water or in the recycle solution for reuse in the next cycle or stripping operation. The solution remaining from this evaporating step consists chiefly of the carbonates inasmuch as excess $CO_2$ is also driven off in the process of evaporation.

This concentrate of the basic amino acids is by no means pure. It contains a considerable amount of neutral and acidic amino acids which were not removed from the bed in the unloading operations. It also contains a greater or lesser amount of any fixed cations such as K+ which have entered with the hydrolysate. Various means may be devised for further purifying the solution but the main one is a method of removing the greater part of the remaining neutrals and acidics from the basic concentrate.

To this end, the primary basic concentrate is passed through a fresh bed of cation exchange material in the H+-regenerated state. By continuing the passage of feed until the pH is 7.0 or 8.0, most of the acidics and neutrals may be flushed off the bed and the basics plus the K+ left on the bed. The preliminary effluent is, of course, void water, followed by barren solution which should be discarded. A pH volume curve similar to that in Fig. 17 characterizes such operation. At the first break of the curve, the effluent is diverted from waste to production, going to Step IV.

At the second break of the curve a cut is made and the effluent from here on up to pH 7.0 and including a rinse is saved for the initial stage of another similar operation or mixed directly with the next batch of primary basic concentrate. The material remaining on the bed is essentially basics plus K+ and can be removed in two ways. It may be stripped off with NH4HCO3 as in the main bed stripping operation, the NH4HCO3 removed by boiling and a secondary concentrate of the basics produced relatively free from neutrals and acidics. This concentrate may then be processed by known methods to isolate the individual basic amino acids if desired.

The other method of removal is to strip and fractionate with an NaOH solution of suitable concentration (say 1 N). An amount of NaOH is used which is equivalent to 100–110% of the alkaline saturation capacity of the bed minus the quantity of inorganic cations held by the bed. The NaOH is followed by a rinse of 0.5 to 1.5 bed volumes. As the NaOH solution flows through the bed, the effluent is tested for pH and cuts or fractionations made accordingly. The initial 0.5 bed volume of effluent, more or less depending on experience, may be discarded as void water. The next solution displaced will contain histidine. The histidine fraction should be continued to about pH 7.6. Further cuts or fractionations would be as follows:

| No. | pH Range | Disposition |
|---|---|---|
| 1 | 7.0–7.6 | Finished cut, histidine. |
| 1a | 7.6–9.0 | To be retreated. |
| 2 | 9.0–9.8 | Finished cut, lysine. |
| 2a | 9.8–10.5 | To be retreated. |
| 3 | 10.5–10.8 | Finished cut, arginine. |
| 3a | Above 10.8 | To be retreated. |

Cuts marked $a$ from several runs should be collected before retreatment in order to provide enough material to saturate a bed. Alternatively a special smaller bed may be provided for this purpose. Another alternative is to run them through ahead of the NaOH in the order 1a, 2a, 3a, NaOH on a subsequent cycle.

Depending on the purity of the NaOH used and the proportions of the amino acids the above pH ranges may have to be varied somewhat on the basis of experience. The finished cuts may not be pure, especially in case of 2 and 3, but high purity is not always necessary.

When no recovery of basic amino acids is desired or when the NH4HCO3 stripping step is omitted for another reason, NaOH and certain other non-acidic compounds may be used instead of NH4OH to serve as the unloading reagent (see Fig. 1a). The recycle technique is used and pH cuts are made the same as with NH4OH. The only requirements are that the solution have a pH of 7.0 or higher, that the anions introduced be non-contaminating; i. e., OH−, HCO3−, CO3=, glutamate− or aspartate−, and that the compound be soluble enough, in water or in the recycle solution, to give a solution of sufficient concentration that excessive dilution is avoided. From 0.5 to 1.0 N is considered adequate. The cations involved of course must not form complexes with the amino acids and no insoluble precipitates must be formed with any of the amino acids present. This will ordinarily restrict the cations to NH4+, the alkalis and the alkalis earths including magnesium. Even though it is not very soluble in water Ca(OH)2 can be used as the unloading reagent by dissolving it in the recycle solution. This gives one a calcium glutamate solution plus excess Ca(OH)2 as the actual unloading solution just as the actual unloading solution in the case of NH4OH is ammonium glutamate plus excess NH4OH. More Ca(OH)2 may be dissolved in the recycle solution than corresponds to calcium glutamate because of the acidic nature of it and the other amino acids present (leucine, etc.) at high pH. Thus not only NaOH but also NaHCO3, Na2CO3, Na glutamate and Na aspartate can be used (also the corresponding ammonium and potassium compounds, Ba(OH)2, Ca glutamate, etc.). The bicarbonates and carbonates are somewhat undesirable because at high concentrations, gas pockets of CO2 tend to form in the beds and to interfere with operation. Some reagents are commonly eliminated because of cost. The reasons why the specified ions are non-contaminating are that in the effluent solution:

(a) OH− has been converted to H2O,
(b) HCO3− and CO3= have been converted to CO2 which can be blown or boiled out before going to the anion bed,
(c) glutamate− or aspartate− are present anyway.

The one exception to this statement is that in certain proteins glutamic acid is present but not aspartic. In such cases one would not normally choose an aspartate for unloading because of the problem of separating the glutamic and aspartic acid later.

This precaution against non-contaminating anions is the reason for recommending the use of de-ionized water for many of the rinses, although if the raw water is low in solids anyway not much harm is done by using it. Any chlorides and sulfates introduced in Steps II, IV, V and VI tend to increase the load on the anion bed and complicate the final crystallization of the acidics. Likewise cations present in the rinses in Steps I, II, III, and IIIa tend to show up in the basic fraction and contaminate it. Cations in the rinse in Step IV contaminate the neutrals.

Figure 5:
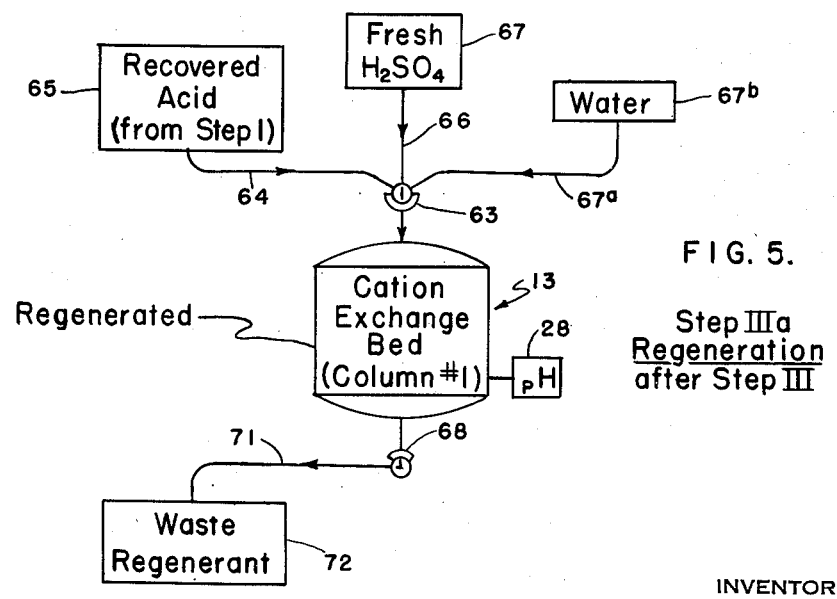
Fig. 5 shows Step III$^a$, namely, regeneration of the exhausted cation bed after it has been unloaded and stripped.

*Regeneration of the primary cation exchange bed (Step IIIa).*—The regeneration of the cation exchange bed, including the reuse of an acid effluent fraction derived from the loading operation (Step I), is diagrammatically illustrated in Fig. 5 (Step IIIa).

The tank 13 in this instance (Fig. 5) is provided with three-way valve 63 through which the influent end of the tank is selectively connectible with a flowpath 64 for passing acid 65 (H2SO4, HCl) recovered from the preceding loading operation (Step I), then with a flowpath 66 for passing fresh $H_2SO_4$ solution 67 and then with a flowpath 67a for passing rinse water 67b which may be de-ionized. The effluent end of tank 13 is provided with valve 68 through which the effluent end is connected with a flowpath 71 for passing spent regenerant solution 72 to waste.

The reuse of acid effluent from the loading operation (Step I) for regeneration of the cation exchange bed may be exemplified in greater detail as follows:

Starting with the bed in the regenerated state, hydrolysate diluted to about 1 N acid concentration is passed through the bed. Let it be assumed that just enough hydrolysate is passed to cause breakthrough of amino acids on rinsing. The resulting effluent fraction contains HCl or $H_2SO_4$ whichever was used in the hydrolysis, which fraction is saved for use as initial regenerant solution.

The amino acids are recovered from the bed by treating with $NH_4OH$ and/or $NH_4HCO_3$ and rinsing. Previously saved loading effluent is passed through the bed to accomplish the initial regeneration of the bed by exchanging $H^+$-ions for $NH_4^+$-ions thus producing an $NH_4Cl$ or $(NH_4)_2SO_4$ effluent solution mixed with excess acid which goes to waste or to other use.

When additional fresh $H_2SO_4$ as a 1 N solution is then passed through the bed, the resulting effluent, including spent rinse water goes to waste or other use.

The amount of this additional regenerant is determined by the degree of regeneration desired and also depends upon whether the regeneration is upflow or downflow through the bed. When using upflow regeneration if one chooses to utilize the saved loading effluent from the preceding cycle, little or no fresh acid solution need be used if one is willing to sacrifice some bed capacity.

In case HCl is used as the hydrolyzing acid, and recovery of HCl for reuse as a hydrolyzing agent is desired, it is proposed not to use the saved loading effluent as a regenerant but to send it to a concentrating step to effect distillation of the water and HCl. That is to say, in this case fresh acid solution only is used, although it may be applied in two-stage, that is countercurrent fashion.

When $H_2SO_4$ is used for hydrolysis it is not proposed to recycle a saved loading effluent fraction to subsequent hydrolysis operation, as it is economical to use fresh concentrated $H_2SO_4$ in the hydrolysis and to use the saved loading effluent fraction for regeneration. Reuse in this manner also alleviates the waste disposal problem. Even though in some instances it may be preferable to use only $NH_4OH$, and in others to use only $NH_4HCO_3$, this will not alter the proposed practice of reusing the loading effluent fraction for initial regeneration.

Figure 6:
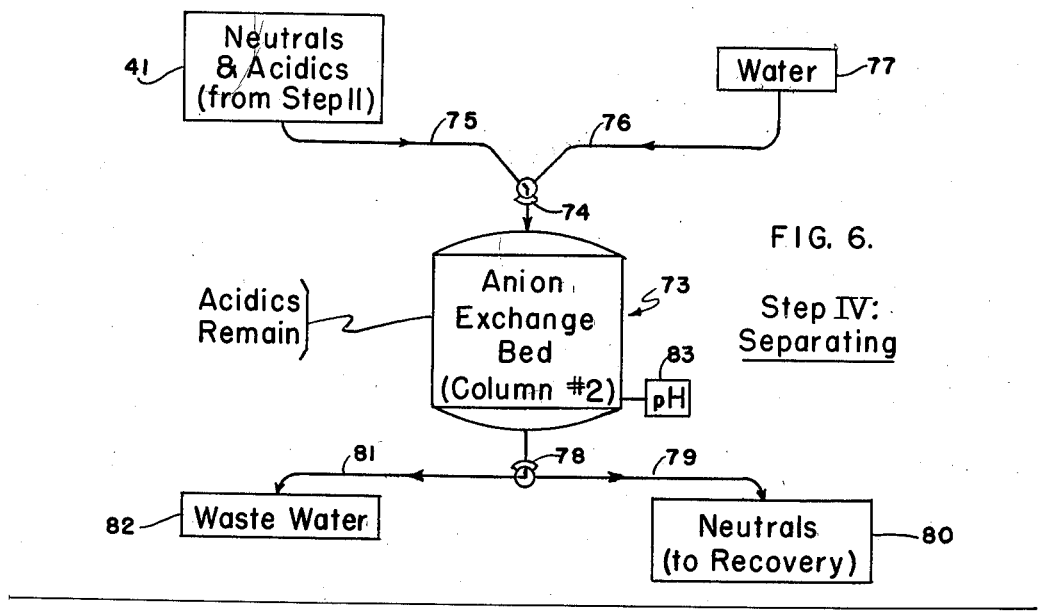
Fig. 6 shows Step IV, namely, Separating of the neutrals from the acidics remaining in the anion exchange bed.

*Separating (Step IV).*—Separating connotes the factionation from each other of the acidic and the neutral amino acids by the selective action of a bed of anion exchange material, and it is diagrammatically illustrated in Fig. 6 (as Step IV).

A tank 73 contains a bed of granular anion exchange material, an example of which may be described as an insoluble resin-like product obtained by the reaction of formaldehyde with an aromatic amine. The tank is provided at its influent end with a two-way valve 74 through which the influent end is connectible with a flowpath 75 for passing to the tank a mixture of neutral and acidic amino acids derived as the production fraction 41 as a result of the unloading operation (Step II, Fig. 3), and then connectible with a flowpath 76 to pass rinse water 77 which may be de-ionized.

The effluent end of the tank 73 is provided with a two-way valve 78 through which the effluent end is connectible with a flowpath 79 to pass off a production fraction 80 containing the neutral amino acids while acidic amino acids remain on the bed, and with a flowpath 81 for passing off void water 82.

In this separating step the production solution fraction 41 from the unloading operation (Step II, see Fig. 3) containing the neutrals and acidics in mixture is passed through the freshly regenerated bed of anion exchange material whereby the acidic amino acids are absorbed or selectively retained by the bed while the neutral amino acids pass off as effluent. The bed is then rinsed with water to remove residual neutrals from the bed.

Alternative modes (a) and (b) of operation usable in this separating step are:

(a) According to the first mode of operation if the amount of acidics applied to the anion bed be insufficient to saturate or exhaust the bed to the point of breakthrough, it is proposed to subject all of the effluent to evaporation for the purpose of recovering the neutral amino acids in the concentrate.

(b) According to the second mode of operation, the bed is operated to leave it saturated with glutamic and aspartic acids, and all effluent solutions having a pH below 6.0 are recycled to be retreated by passing through the freshly regenerated anion bed in the subsequent operating cycle thereof. In this way a capacity of 2.1 m. eq. per gram of Duolite A-2 can be attained instead of 1.7 m. eq. per gram in mode (a), even though other weak acids were also present.

*Removing (Step V).*—Removing connotes the removal or dislodging of the acidic amino acids from the anion exchange bed and the consequent regeneration.

Figure 7:
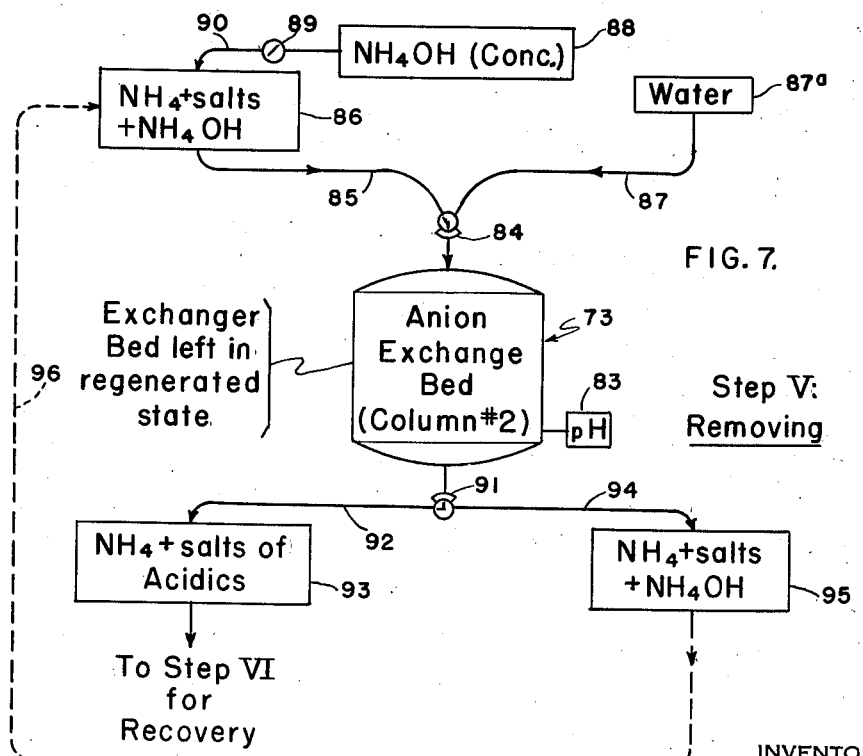
Fig. 7 shows Step V, namely, Removing the remaining acidics from the anion exchange bed.

This treatment step is diagrammatically illustrated in Fig. 7 in which the influent end of anion exchange tank 73 is provided with a two-way valve 84 through which the influent end is selectively connectible with a flowpath 85 for passing recycle solution 86 containing $NH_4^+$ salts and $NH_4OH$, and with a flowpath 87 for passing rinse water 87a which may be de-ionized. A solution 88 containing fresh $NH_4OH$ may be added in desired proportion to the recycle solution 86 as indicated by a valve 89 in flowpath 90.

The effluent end of the anion exchange tank 60 is provided with a two-way valve 91 through which the effluent end is selectively connectible with a flowpath 92 for passing off a production fraction 93 representing the bulk of the $NH_4^+$ salts of the acidics (such as ammonium or sodium glutamate or aspartate) and with a flowpath 94 for passing a subsequent solution fraction 95 containing trailing $NH_4^+$ salts and $NH_4OH$, which fraction may serve as recycle solution to be passed through the freshly regenerated anion bed in the subsequent cycle. Such recycle is indicated (in dotted lines) by the recycle flowpath 96.

That is to say, the acidic amino acids are removed from the anion exchange bed with $NH_4OH$ or NaOH, $NH_4OH$ at present being the cheaper one. Recycling is advantageous since an excess of base is required in order to effect complete removal of the acids from the bed.

Recycling of effluent solution fraction, for instance above pH 7.0 or 7.5 in the removing step (Step V) affords an economy of alkali in Step V and an economy of acid in the subsequent liberating Step VI. Alternatively the entire effluent solution containing excess $NH_4OH$ can be passed to the liberating step. However, the solution may also first be boiled to drive off excess $NH_4OH$ prior to being passed on to the liberating step.

*Liberating (Step VI).*—Liberating connotes the treatment of the production effluent fraction 93 from the anion exchange bed containing the $NH_4$ salts plus $NH_4OH$ by contacting with an H-ion regenerated cation exchange material to produce the free or liberated acidic amino acids from their $NH_4^-$ salts.

Figure 8:
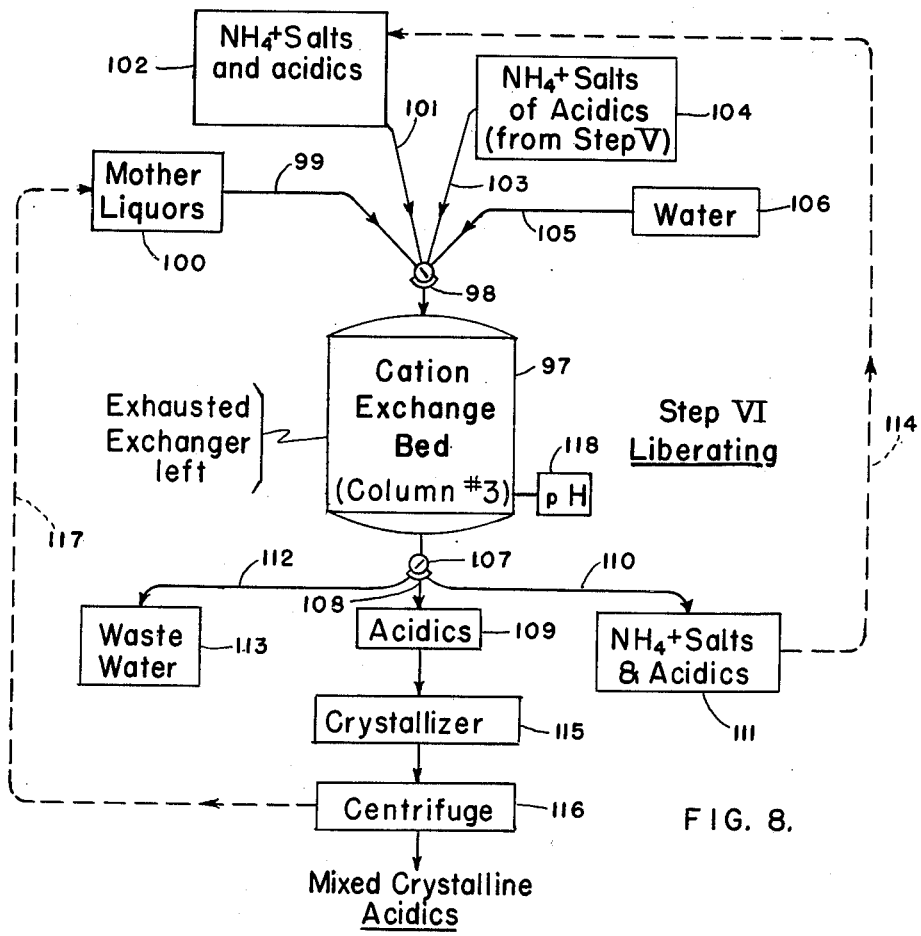
Fig. 8 shows Step VI, namely, Liberating in the second cation exchange bed the acidics from the contaminated solution in which form they issue from the anion exchange bed.

In Fig. 8 which illustrates diagrammatically the liberating operation, a tank 97 contains a bed of granular cation exchange material.

The influent end of the tank is provided with a four-way valve 98 through which the influent is selectively and sequentially connectible with a flowpath 99 to pass mother liquor 100 obtained and recycled from the crystallization and centrifuge step of the liberated or final acidics, then with a flowpath 101 for passing a solution 102 containing acidics mixed with $NH_4^+$ salts of acidics and recycled from preceding liberating operation, then with a flowpath 103 for passing a solution 104 which is the effluent production fraction 93 of Step V (Fig. 7), representing $NH_4^+$ salts removed from the anion exchange bed 73, and finally with a flowpath 105 for passing rinse water 106 which may be de-ionized.

The effluent end of tank 97 is provided with a three-way valve 107 through which the effluent is selectively and sequentially connectible with a flowpath 112 for passing off spent void water and barren solution 113 to waste, then with a flowpath 108 for passing off a production fraction 109 representing liberated acidics for further treatment to recover acidic amino acid crystals, then with a flowpath 110 for passing off a subsequent effluent fraction 111 containing acidics in mixture $NH_4^+$ salts of the acidics.

The solution mixture 111 of acidics and $NH_4^+$ salts thereof represents recycle solution to be retreated in the next cycle as shown (in dotted lines) by recycle flowpath 114.

The production effluent fraction 109 of liberated acidic amino acids is passed on to a crystallizer station 115. The resulting amino acid crystals are passed to a centrifuging station 116 to separate mother liquors for recycling and retreatment in the freshly regenerated cation exchange bed of tank 97 in a subsequent cycle as indicated by a recycle flowpath 117. A pH indicator 118 is shown at the effluent end of tank 97.

The production effluent fraction 93 from the removing operation (Step V, Fig. 7) consists of a solution of ammonium or sodium glutamate and aspartate along with some extra acid (acidic amino acid) if the bed is run to exhaustion or acid breakthrough. While this solution might be evaporated to recover sodium or ammonium glutamate as such, an alternative is that of liberating the acidics as such by passing the solution through an H-ion regenerated cation exchange bed of suitable size. Prior to entering the bed the solution is heated to a degree which depends upon the concentrations involved, to prevent glutamic or aspartic acid from crystallizing in the bed, 60° C. being ordinarily sufficient. The mechanism of this exchange operation is rather similar to the unloading operation (Step II) above, except for the fact that something like loading and unloading occur more or less simultaneously with the net result that the acidics emerge as such converted from the original solution of their salts.

That is to say, during the first part of the liberating operation glutamic acid and aspartic acid as well as the accompanying inorganic cations (such as $NH_4^+$ or $Na^+$) are all being loaded into the exchange granules, during which time the effluent from the bed is a barren solution. However, the feed solution in this case has the characteristics of an unloading solution, and as its flow is further continued, it acts to unload the amino acids present from the bed, whereby the amino acids, namely glutamic and aspartic acid, are desorbed and carried to pass into the effluent, while the inorganic cations are yet being adsorbed by the bed.

The Liberating step (Step VI) can be effectively conducted on the basis of pH values of the resulting effluent solution. A graph presenting an example of such pH values in Fig. 19 is comparable to the pH-graph in Fig. 17 of the Unloading step insofar as it has a first and second break B′ and B″ respectively serving to substantially define what in the Liberating step is to be the production fraction containing most of the acidics and little or none of the $NH_4^+$ being freed in the Liberating step.

The breakpoints or breaks B′ and B″ represent criteria whereby the effluent solution discharging from the bed can be divided into an initial barren fraction $F_1$ which may be sent to waste, an intermediate production fraction $F_2$ containing most of the desired acidic amino acids, and a mixed fraction $F_3$ containing acidic amino acids along with some alkali salts of these acids which mixture may be held for treatment in a subsequent Liberating step and which may therefore be termed the recirculation fraction.

Figure 19:
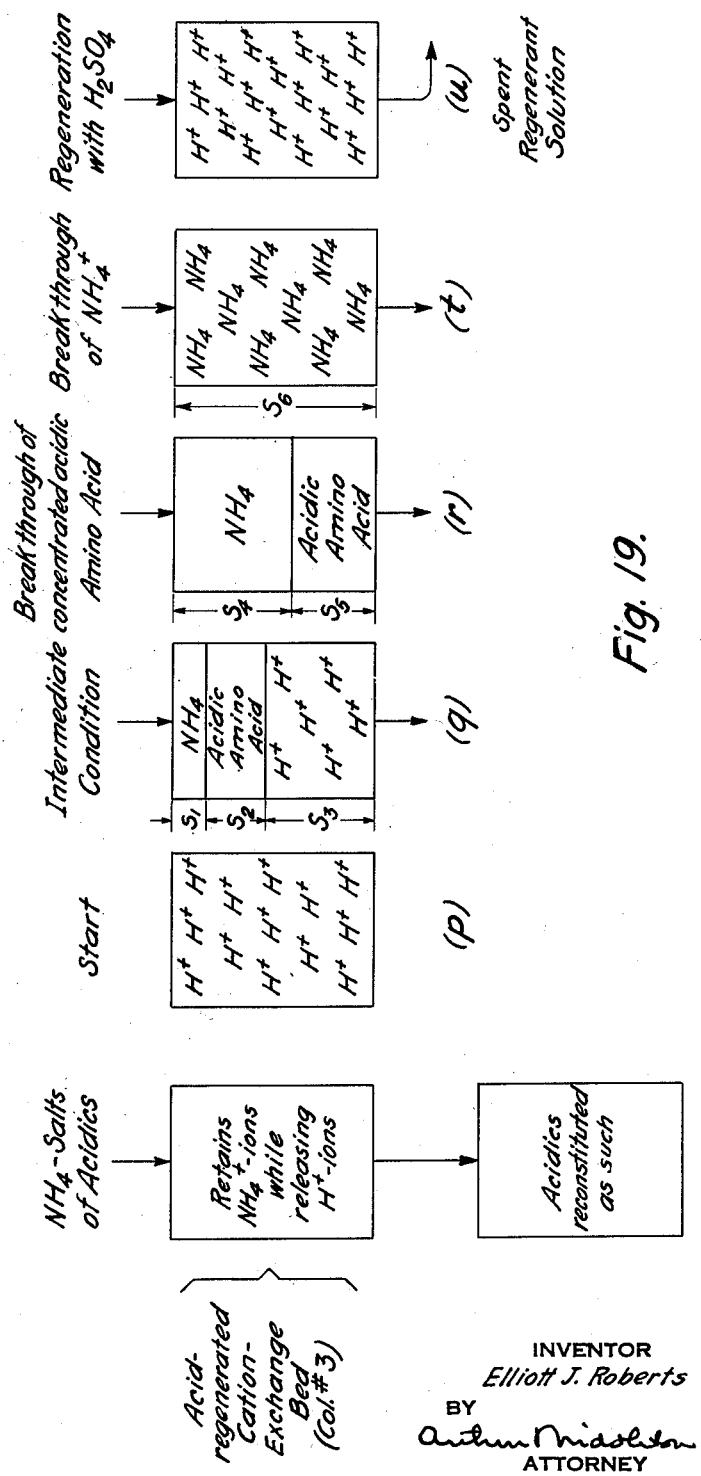
Fig. 19 illustrates the conduct of the Liberating Step in terms of conditions of the cation exchange bed.

The general shape of the Fig. 19-graph of the Liberating step presents an initial ascending portion $F_1$ leading to the first break B′, an intermediate portion $F_2$ which is significantly level constituting a "plateau" leading to the second break B″, and a third portion $F_3$ ascending from the break B″. In this way the production fraction $F_3$ is defined by the "plateau" portion between the breaks B′ and B″ of the graph. The "plateau" pH of the production fraction according to this example lies at about 3.1 to 3.3.

As a general evaluation, it may be said that the Fig. 19-graph of the Liberating step is comparable to the Fig. 17-graph of the Unloading step, insofar as both graphs present characteristic breaks as criteria in determining the extent of the production fraction. However, during Liberation the average pH values are found to be comparatively lower than those in the Fig. 17-graph, because of the absence of the neutrals.

Speaking in averages for the Fig. 19 Liberation curve it may be said that the first significant pH change or break occurs at a pH of about 2.5 due to the presence of some foreign acids other than amino acids which appear to carry through the preceding process steps to this stage; the pH then rising to about 3.1 to 3.3 over a small portion D′ of the graph to remain at that value, herein termed the "plateau" value, fairly steadily until $NH_4^+$ (or $Na^+$) breakthrough occurs at the second break B″. The pH value of the level plateau portion of the graph where most of the acidic amino acids are discharging from the bed depends upon the proportions of glutamic and aspartic acids in the acidics as well as upon the amount of foreign acids present.

In the Liberating step the cation exchange bed loads to the point of breakthrough while a considerable volume of resulting barren solution is passed to waste. Thereupon valuable acidics solution appears in the effluent which upon crystallizing deposits glutamic and/or aspartic acid. The pH of the effluent suddenly starts to rise as $NH_4^+$ or $Na^+$ appears or leaks through until eventually all of the acidic amino acids are driven off the bed. Solution 104 should be passed until the pH of the effluent 110 is about equal to that of the influent 104. This will ordinarily be close to pH 7.0. If much lower than this, some acidics may remain on the bed and should be removed with $NH_4OH$.

The mother liquors derived from the separation or centrifuging of the crystals are passed through the freshly regenerated cation exchange bed in tank 97 in a subsequent cycle in order to retrieve the remaining acidics values from the mother liquor and to discharge the water containing these values to waste along with the thus isolated impurities.

Figure 9:
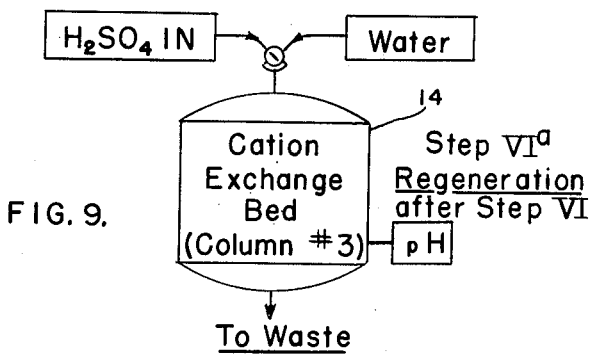
Fig. 9 shows Step VI$^a$, namely, the regeneration of the second cation exchange bed.

The solution fraction or fractions collected above the pH break point represent the recycle fraction which is followed by fresh production effluent solution 93 from the anion exchange bed of the removing operation (Step V, Fig. 7). No evaporation ought to be necessary if the operation is properly conducted and balanced When the bed has been saturated with base and stripped of acidic amino acid, it is regenerated by applying 1 N $H_4SO_2$, for example in 200% excess, and subsequently rinsed with water (see Fig. 9), whereupon the bed is ready for reuse in a next cycle of liberating operation.

The recycling of solution 111 ($NH_4^+$ salts plus acidics) is important in this step since it is analogous to the unloading Step III above, and particularly to that mode wherein a solution of $NH_4$-glutamate is passed through a freshly regenerated cation exchange bed of relatively small capacity.

All solutions beyond the $NH_4$-breakthrough must be retreated on a freshly regenerated bed (recycled) if the glutamic and/or aspartic acid is to be recovered.

Thus, by means of the foregoing six steps I, II, III, IV, V and VI, and by the use of a cation exchange bed (column No. 1) an anion exchange bed (column No. 2), and another cation exchange bed (column No. 3), the amino acids of a protein hydrolysate are fractionated into the three natural groups of amino acids, namely the neutral-, the acidic-, and the basic amino acids.

The unloading step (II) and the liberating step (VI) resemble each other insofar as in each case the effluent solution passing from the ion exchange bed is fractionated or divided on the basis of certain pH-criteria making it possible to obtain in each instance a relatively concentrated and relatively pure amino acid production fraction free from cations. However, in the unloading step the relatively concentrated amino acid production fraction consists of both acidics and neutrals whereas in the liberating step it consists of acidic amino acids only, both production fractions being free from cations which is their important characteristic. In the Fig. 17-graph such operational criteria are represented by the breakthrough points $B_1$ and $B_2$ for amino acids (acidics plus neutrals) and for $NH_4$ respectively. In the Fig. 19-graph applying to the Liberating Step the operational criteria are represented by breakthrough points B' and B'' for acidic amino acid and for $NH_4$ respectively.

Thus, an operation, otherwise identical with the liberating step, but characterized by the presence of neutrals, might be performed on a suitable mixture of neutrals, acidics and cations but no contaminating anions as a starting solution and the cation-free effluent sent on to an anion exchange bed for further fractionation.

*Momentary characteristic conditions of the beds (see Figs. 10 to 16 and 19)*

The graphical presentations in Figs. 10 to 16 illustrate the condition of the beds (column No. 1, No. 2, No. 3) at various points of the process.

Fig. 10 represents the cation exchange bed (column No. 1) in different conditions (a), (b), and (c) of the loading (Step I). An initial condition (a) shows the bed completely regenerated with $H^+$-ions. After hydrolysate has been passed through the bed until there is some amino acid leakage (as neutrals- and acidics- ($E^+$) as well as basic- ($B^+$) amino acids will have been loaded onto the bed) the bed will have reached condition (b). If no recycling of hydrolysate is employed the bed is then subjected to unloading (Step II). If recycling is employed, the recycle solution enters the bed ahead of the straight hydrolysate, and after a part of the hydrolysate has been passed, the condition (b) exists in the bed. Further passage of hydrolysate and subsequent rinsing leads to condition (c) of the cation bed which is similar to (b) except for a somewhat greater amount of amino acid on the bed. It will be noted in these representations of Fig. 10 that some basic amino acids ($B^+$) are shown with a larger proportion of neutrals and acidics ($E^+$). Not shown are $NH_4^+$ and $K^+$ contained in the hydrolysate. This also indicates that not all $H^+$-ions are displaced by $B^+$ or $E^+$ from the bed even loaded to capacity condition (c).

Fig. 11 represents a series of conditions (c), (d), and (e) in the unloading (Step II) of the cation exchange bed. Starting the unloading with condition (c), recycle solution consisting of $NH_4OH$ mixed with neutrals and acidics is passed through the bed followed by $NH_4OH$ and by rinse water. There is some further accumulation on the bed of $E^+$ before any leakage thereof occurs. Then E flows from the bed as its place on the bed is being taken by $NH_4^+$ until condition (d) is reached when $NH_4^+$ starts leaking from the bed. At this time all of the $B^+$ is still on the bed together with an appreciable amount of $E^+$. After discarding the barren solution being passed from the bed at the start and collecting the solution containing E up to the point when $NH_4^+$ leaks through, a subsequent fraction of the effluent is saved for recycling to the next unloading operation.

At the end of this unloading cycle the bed will have lost all but a small portion of the $E^+$ but it still holds the $B^+$ according to condition (e).

According to Fig. 12, condition (e) is carried over to the start of the stripping operation (Step III). As $NH_4HCO_3$ is being passed through the bed, the remaining E is removed together with the B. Condition (f) shows the bed after part of the solution has been passed. After a sufficient quantity of stripping solution has acted upon the bed, a condition (g) will have been reached. Thereupon the bed may be regenerated with $H_2SO_4$ as per condition (g) and (a) (see Fig. 13), condition (h) showing an intermediate phase of the regeneration.

In Fig. 14 the anion exchange bed (column No. 2) in regenerated condition and ready for use in the separating operation (Step IV) is shown as a blank in condition (i). As the production solution containing E is passed through the bed, E is fractionated or split into A (acidics) and N (neutrals) while the neutrals N pass off as effluent. Up to the time when condition (j) is reached, which is where the acidics break through, the neutrals N pass off as production fraction. They may be concentrated for recovery or utilized in any other desired manner.

The exhaustion of the anion exchange bed may be stopped at this point, although greater capacity may be attained by running further and saving the mixture of neutrals and leaking acidics to be recycled to serve as initial solution in a subsequent separating operation.

When fully saturated with acidics as in condition (k), the bed is rinsed and then subjected (see Fig. 5) in that condition (k) to the removing operation (Step V). $NH_4OH$ (or $NaOH$) is then passed through the bed producing an effluent solution containing $NH_4{}^+$-salts of the acidics to be subjected to the subsequent liberating operation (Step VI). As condition (l) of the bed is reached some free $NH_4OH$ starts leaking through the bed. For the sake of efficient operation the solution fraction from this point on is saved to be recycled for retreatment in the subsequent removing operation. Rinsing from the bed all of the removing solution ($NH_4OH$) should leave the bed in condition (i), that is regenerated and again ready for use.

The liberating operation (Step VI) according to Fig. 16, starts with condition (a) of exchange column No. 3, that is the bed saturated with $H^+$-ions. Mother liquors from crystallization containing A are first passed through the bed whereby the A is retained by the bed while water and impurities in the effluent are sent to waste. Next recycle solution from a previous operation is passed through the bed whereby as before all of the A and $NH_4{}^+$ are retained by the bed while the effluent goes to waste. The fresh production fraction from the removing operation (Step V) is passed through the bed. Then at some point —see condition (m)—the acidics A will start leaking from the bed. From this point until the $NH_4$ starts leaking—condition (n)—the effluent fraction is saved and sent to crystallization for the recovery of A. Feed solution continues to be passed until a pH of 7.0 is reached in order that all A be removed from the bed—see condition (o)—the effluent being saved for recycling to a subsequent operation.

The operation of the cation exchange bed (column No. 3) in the Liberating Step (Step VI), although represented in Fig. 16, is illustrated more elaborately in Fig. 19 with greater emphasis being placed upon the showing of certain progressive zoning occuring in the bed.

In Fig. 19 the initial or freshly acid-regenerated condition of this cation exchange bed is represented at (p) indicating that the bed is saturated with available H-ions. A subsequent condition (q) shows the bed in an initial stage of exhaustion by the flow of alkali salts of acidics thereto, with $NH_4$-ions occupying the top zone of depth $S_1$ of the bed, while acidic amino acids occupy an intermediate zone of the depth $S_2$ subjacent to the $NH_4$-zone, and the balance of the bed downwardly still occupied by H-ions representing a zone of the depth $S_3$.

Continued flow of the alkali salts of the acidics to the bed brings about the condition (r) of the bed where the acidics breakthrough (see point B' in Fig. 19) occurs, when the $NH_4$-zone at the top of the bed will have grown to a depth $S_4$ and the acidics zone also having grown will be occupying the balance or lower portion $S_5$ of the bed, since the H-ions as such will have disappeared.

Further continued flow of the alkali salts of the acidics to the bed will result in the condition (t) when $NH_4$-breakthrough (see point B'' of Fig. 19) occurs, as $NH_4$ will then have displaced the acidics into the effluent solution and will then be occupying substantially the entire depth $S_5$ of the bed.

Steps I to VI are illustrated in terms of representative Ionic Exchange Equilibrium Equations as follows: (see also Fig. 20)

Step I—Loading:

(1) For reaction with contaminants:

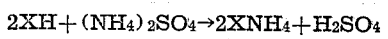
$$2XH + (NH_4)_2SO_4 \rightarrow 2XNH_4 + H_2SO_4$$

(2) For reaction with amino acids:

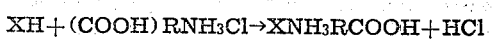
$$XH + (COOH)RNH_3Cl \rightarrow XNH_3RCOOH + HCl$$

Note: X = Functional radical of the cation exchange material
R = the balance of the amino acid molecule Step II—Unloading:

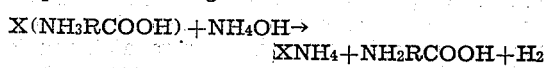
$$X(NH_3RCOOH) + NH_4OH \rightarrow XNH_4 + NH_2RCOOH + H_2$$

R = Organic radical of the amino acid molecule

Step III—Stripping:

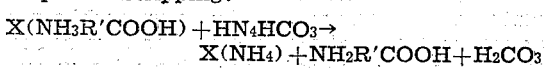
$$X(NH_3R'COOH) + HN_4HCO_3 \rightarrow X(NH_4) + NH_2R'COOH + H_2CO_3$$

R' = Organic radical containing basic group, i. e. the balance of the molecule of a basic amino acid molecule Step IV—Separating:

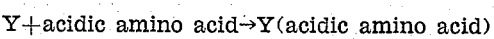
$$Y + \text{acidic amino acid} \rightarrow Y(\text{acidic amino acid})$$

Y = Functional radical of the anion exchange material

Step V—Removing:

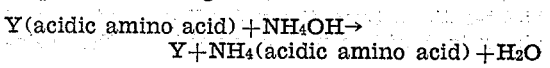
$$Y(\text{acidic amino acid}) + NH_4OH \rightarrow Y + NH_4(\text{acidic amino acid}) + H_2O$$

Y = Functional radical of the cation exchange material

Step VI—Liberating:

(1) $2XH + NH_4(\text{acidics}) \rightarrow XNH_4 + X(\text{acidics})$

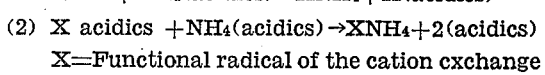
(2) $X \text{ acidics} + NH_4(\text{acidics}) \rightarrow XNH_4 + 2(\text{acidics})$ X = Functional radical of the cation exchange material

*Criteria for operational control*

*Loading*—Effluent pH values are not indispensible criteria in this step. Analysis of the effluent can be used as a criterion.

*Unloading*—Criteria for this step lie in the pH values of the effluent solution, such as exemplified in the Fig. 17 graph discussed above.

*Stripping*—Effluent pH values are not necessary criteria in this step. $NH_4HCO_3$ solution is passed through the bed until no further formol nitrogen is removed. The only criterion I now know of is analysis of the effluent.

*Separating*—After wasting as much void water as possible all effluent having a pH above 6.0 is sent to neutrals recovery. Effluent of pH less than 6.0 is returned for retreatment.

*Removing*—Solutions having a pH below 7.5 are sent on to the step (liberating) while effluent of pH above 7.5 is returned to tank 86.

*Liberating*—Effluent is wasted until a pH is reached which on the basis of previous experience and formol titration shows that acidics are leaking. The effluent is then diverted to tank 109 until the pH starts to rise abruptly from the plateau lying usually between 3.0 and 3.3. Further effluent up to pH 7.0 including rinse is returned to tank 102. Operational criteria for this step lie in the pH values of the effluent solution, such as exemplified in the Fig. 18-graph discussed above.

What I claim is:

1. The process for the separation of an aqueous solution mixture of amino acids such as a protein hydrolysate into groups of acidic-, neutral-, and basic-amino acids respectively by treatment with ion exchange material, characterized in that the mixture is passed through a bed of acid-regenerated cation exchange material for absorbing thereon the amino acids indiscriminately while impurity anions pass in the effluent from the bed, selectively unloading the acidic and neutral amino acids by displacing them from their combination with the exchange material by passing through the bed an unloading solution comprising ammonium hydroxide as a base to effect converting the acidic and neutral amino acids but substantially not the more strongly held basic amino acids into noncationic form in which they are eluted from the exchange material whereby the material is left containing basic-amino acids along with $NH_4^+$-cations while the acidics and neutral amino acids are obtained in the effluent as displaced free amino acids, meanwhile collecting the resulting effluent solution in a first fraction up to a point defined substantially by a point of abrupt increase in the pH-change of the effluent solution, said fraction containing acidic and neutral amino acids substantially pure, namely uncontaminated by $NH_4^+$-cations, and in a second fraction containing substantially the remainder of the acidic and neutral amino acids although contaminated by $NH_4^+$-cations from the unloading solution and also mixed with a minor quantity of the basic-amino acids displaced by the unloading solution while a major quantity thereof remains on the bed, then passing through the bed a stripping solution comprising as stripping reagent a salt of a group consisting of ammonium carbonate and bicarbonate providing a high concentration of ammonium cations as distinct from the base ammonia which is not highly ionized in solution for effecting ionic exchange as between the ammonium cations and the cationic basic-amino acids on the bed whereby there result in the effluent the basic-amino acids as salts together with volatile molecules of excess stripping reagent, such stripping reagent being separable from the basic-amino acid salts by volatilization, and employing said second fraction in addition to said unloading solution in a subsequent unloading operation whereby acidic and neutral amino acids in said fraction are recovered while $NH_4^+$ as well as the basic amino acids therein act as unloading agents.

2. Process according to claim 1, characterized in that the unloaded neutral and acidic amino acids are further separated from each other by passing the mixture through an alkali-regenerated anion exchange material whereby the acidic acids are absorbed by the material while neutral acids pass therethrough and therefrom, and that the residual acidic acids are removed from the material by alkali-regeneration thereof so that acidic acids are contained in the resulting effluent solution as alkali salts.

3. Process according to claim 2, characterized in that the alkali salts are converted to their acids by being contacted with acid-regenerated cation exchange material.

ELLIOTT J. ROBERTS.

REFERENCES CITED

The following references are of record in the file of this patent:

UNITED STATES PATENTS

| Number | Name | Date |
| --- | --- | --- |
| 2,388,194 | Vallez | Oct. 30, 1945 |
| 2,388,195 | Vallez | Oct. 30, 1945 |
| 2,413,791 | Shafor | Jan. 7, 1947 |
| 2,462,597 | Block | Feb. 22, 1949 |

OTHER REFERENCES

Block: "Amino Acid Comp. of Proteins and Foods" (Thomas), pp. 292–293 (1945).

Freudenberg et al.: Naturwissenschaften, vol. 30, p. 87 (1942).